US012711532B2

(12) United States Patent
Boué et al.

(10) Patent No.: US 12,711,532 B2
(45) Date of Patent: Aug. 18, 2026

(54) RECOMMENDATION GENERATION USING HETEROGENEOUS DISTANCE FUNCTION

(71) Applicant: Microsoft Technology Licensing, LLC, Redmond, WA (US)

(72) Inventors: Laurent Boué, Petah Tikva (IL); Yasmin Bokobza, Ramat Gan (IL); Kiran Rama, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 18 days.

(21) Appl. No.: 18/640,814

(22) Filed: Apr. 19, 2024

(65) Prior Publication Data

US 2025/0328943 A1 Oct. 23, 2025

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS 11,029,926 B2 * 6/2021 Bodin ....................... G06F 8/30
2019/0295196 A1 * 9/2019 Fleming ............... G06Q 10/067
2020/0097496 A1 * 3/2020 Alexander ............ G06F 16/355
2022/0253722 A1 * 8/2022 Wu .................... G06Q 30/0631
2022/0343372 A1 * 10/2022 Li ...................... G06Q 30/0271

FOREIGN PATENT DOCUMENTS

EP 2178007 A2 4/2010

OTHER PUBLICATIONS

Schultz, Matthew, et al., "Learning a Distance Metric from Relative Comparisons", Advances in Neural Information Processing Systems 16—Proceedings of the 2003 Conference, Jan. 1, 2004 (Year: 2004).*

(Continued)

*Primary Examiner* — Ethan D Civan
(74) *Attorney, Agent, or Firm* — Weaver IP L.L.C.

(57) ABSTRACT

Systems, methods, devices, and computer readable storage media described herein provide techniques for generating recommendations utilizing a heterogeneous distance function. In an aspect, a measure of relevancy between a first data item and a second data item is received. A setting of an adjustable parameter of a parameterized heterogeneous distance function is determined based on the measure of relevancy. The parameterized heterogeneous distance function comprises first and second sub-functions. The first sub-function calculates a distance between data items based on features of a first data type and the second sub-function calculates a distance between data items based on features of a second, different, data type. A recommendation system is caused to utilize the parameterized heterogeneous distance function to generate a recommendation based on received input. In a further aspect, the measure of relevancy is determined as a function of a measure of interactions and a measure of impressions.

20 Claims, 7 Drawing Sheets

300

Receive a first measure of relevancy between a first data item and a second data item (302)

Determine a first setting of an adjustable parameter of a parameterized heterogenous distance function based on the first measure of relevancy, the parameterized heterogeneous distance function comprising a first sub-function and a second-subfunction, the first sub-function calculating a distance between data items based on features of a first data type, the second sub-function calculating a distance between data items based on features of a second data type different from the first data type (304)

Cause a recommendation generator to utilize the parameterized heterogeneous distance function to generate a recommendation based on received input (306)

(56) References Cited

OTHER PUBLICATIONS

Zhou, Ke et al., "Learning Gain Values and Discount Factors of Discounted Cumulative Gains", IEEE Transactions on Knowledge and Data Engineering, vol. 26, No. 2, Feb. 1, 2014, pp. 391-404 (Year: 2014).*

Van Der Loo, Mark, "Introduction to the gower package", Retrieved From: https://cran.r-project.org/web/packages/gower/vignettes/intro.pdf, Dec. 22, 20222, 5 Pages.

Wilson, et al., "Improved heterogeneous distance functions." Journal of artificial intelligence research 6, 1997, pp. 1-34.

Extended European Search Report received for EP Application No. 25167307.5, mailed on Jun. 26, 2025, 11 pages.

* cited by examiner

200

Recommendation System 108

Parametrization Component 116

Heterogeneous Distance Function 202

Sub-Function 206A

Sub-Function 206*n*

Setting Determiner 204

208

210

212

214

Recommendation Generator 118

216

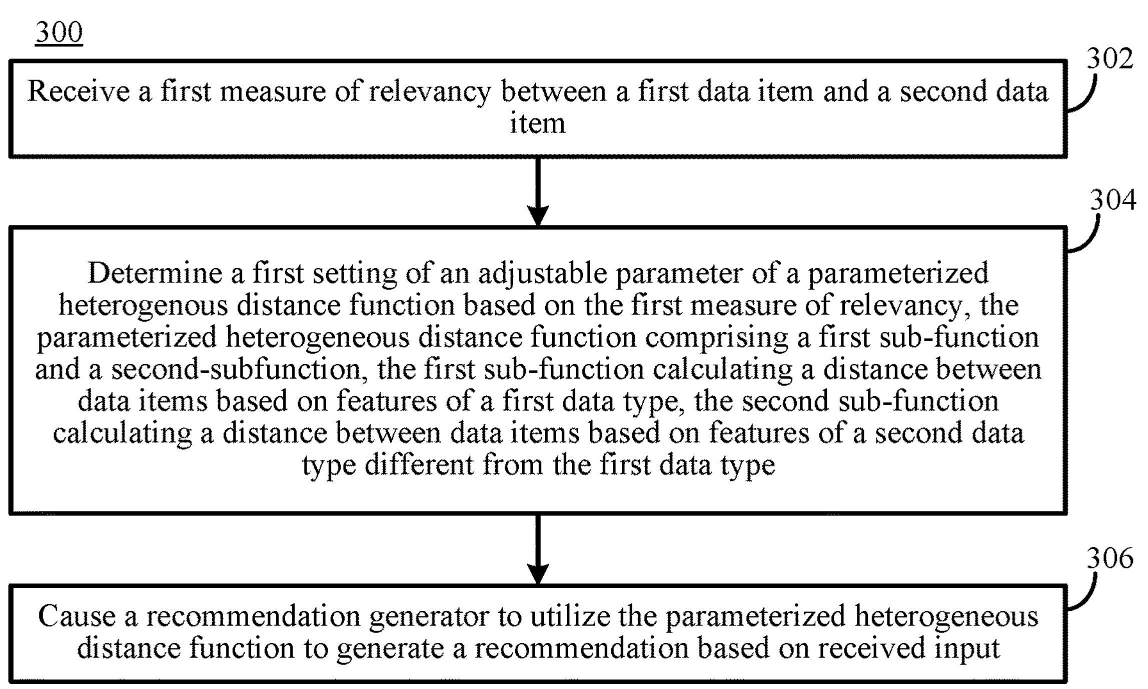
FIG. 3
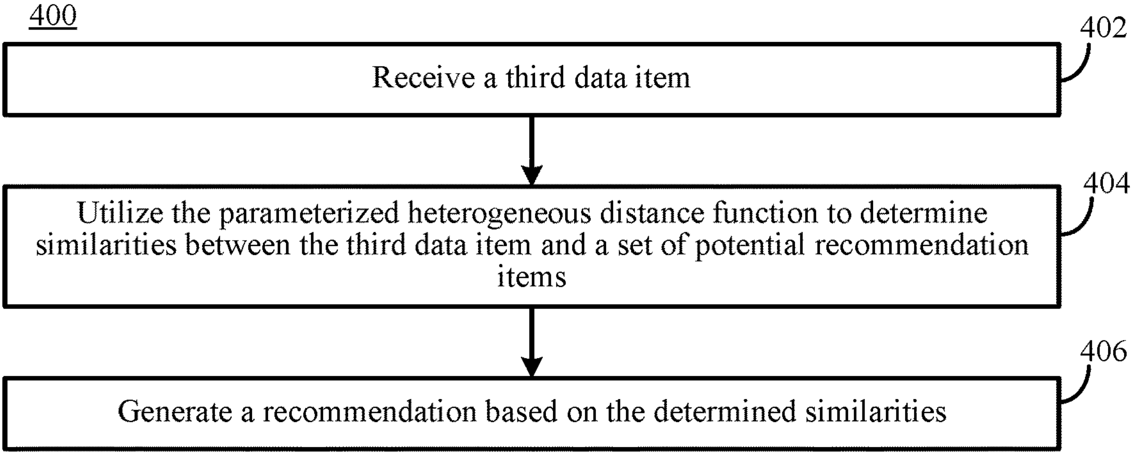
FIG. 4
500
Select a potential recommendation item with a similarity to the third data item higher than other potential recommendation items of the set of potential recommendation items
502
FIG. 5

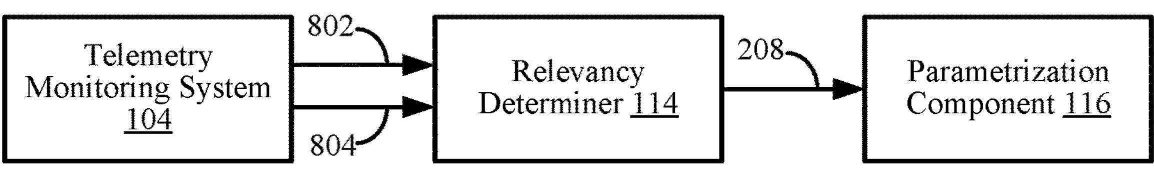
FIG. 8
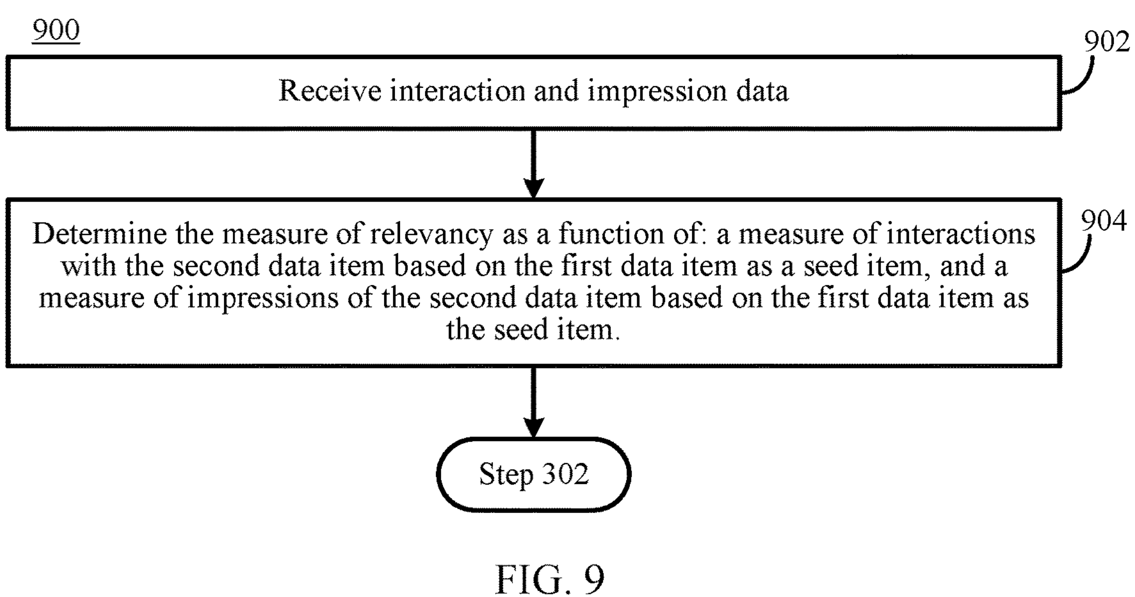
FIG. 9
1000
| | **r_d1** | **r_d2** | **...** | **r_dn** |
|---|---|---|---|---|
| **s_d1** | | CTR(r_d2, s_d1) | ... | CTR(r_dn, s_d1) |
| **s_d2** | CTR(r_d1, s_d2) | | ... | CTR(r_dn, s_d2) |
| **...** | ... | ... | ... | ... |
| **s_dn** | CTR(r_d1, s_dn) | CTR(r_d2, s_dn) | ... | |
FIG. 10

RECOMMENDATION GENERATION USING HETEROGENEOUS DISTANCE FUNCTION

BACKGROUND

Implementations of recommendation systems are utilized to recommend content, products, or other items. For instance, a recommendation system may make a recommendation based on a "seed" item. In implementations, the recommendation system recommends one or more other items based on features of the seed item and features of the other items.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for generating recommendations using a heterogeneous distance function. For example, in an aspect, a first measure of relevancy between a first data item and a second data item is received. A first setting of an adjustable parameter of a parameterized heterogeneous distance function is determined based on the first measure of relevancy. The parameterized heterogeneous distance function comprises first and second sub-functions. The first sub-function calculates a distance between data items based on features of a first data type and the second sub-function calculates a distance between data items based on features of a second, different, data type. A recommender system is caused to utilize the parameterized heterogeneous distance function to generate a recommendation based on received input.

In a further embodiment, the measure of relevancy is determined as a function of a measure of interactions with the second data item based on the first data item as a seed item and a measure of impressions of the second data item based on the first data item as the seed item.

In a further embodiment, the recommender system is caused to utilize the parameterized heterogeneous distance function to determine similarities between a third data item and potential recommendation items and generate a recommendation based on the determined similarities.

In a further embodiment, an initial version of the parameterized heterogeneous distance function is used to calculate a first distance between the first data item and the second data item and a second distance between the first data item and a third data item. The first and second distances are ranked. A first rank similarity between the rank of the first and second distances and a rank of the first measure of relevancy and a second measure of relevancy between the first and third data items is determined. Subsequent to determining the first rank similarity, the first setting is determined.

In a further embodiment, an updated version of the parameterized heterogeneous distance function results from said determining the first setting. The updated version is used to calculate a third distance between the first data item and the second data item and a fourth distance between the first data item and the third data item. The third and fourth distances are ranked. A second rank similarity between the rank of the third and fourth distances and the rank of the first and second of measures of relevancy is determined. Subsequent to determining the second rank similarity, a second setting of the adjustable parameter or another adjustable parameter is determined.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows a flowchart of a process for causing a recommendation system to utilize a parameterized heterogeneous distance function, in accordance with an example embodiment.

FIG. 4 shows a flowchart of a process for generating a recommendation, in accordance with an example embodiment.

FIG. 5 shows a flowchart of a process for selecting a recommendation item, in accordance with an example embodiment.

FIG. 8 shows a block diagram of a system for determining a measure of relevancy, in accordance with an example embodiment.

FIG. 9 shows a flowchart of a process for determining a measure of relevancy, in accordance with an example embodiment.

FIG. 10 depicts an example click-through rate table, in accordance with an example embodiment.

Figures 1, 2:
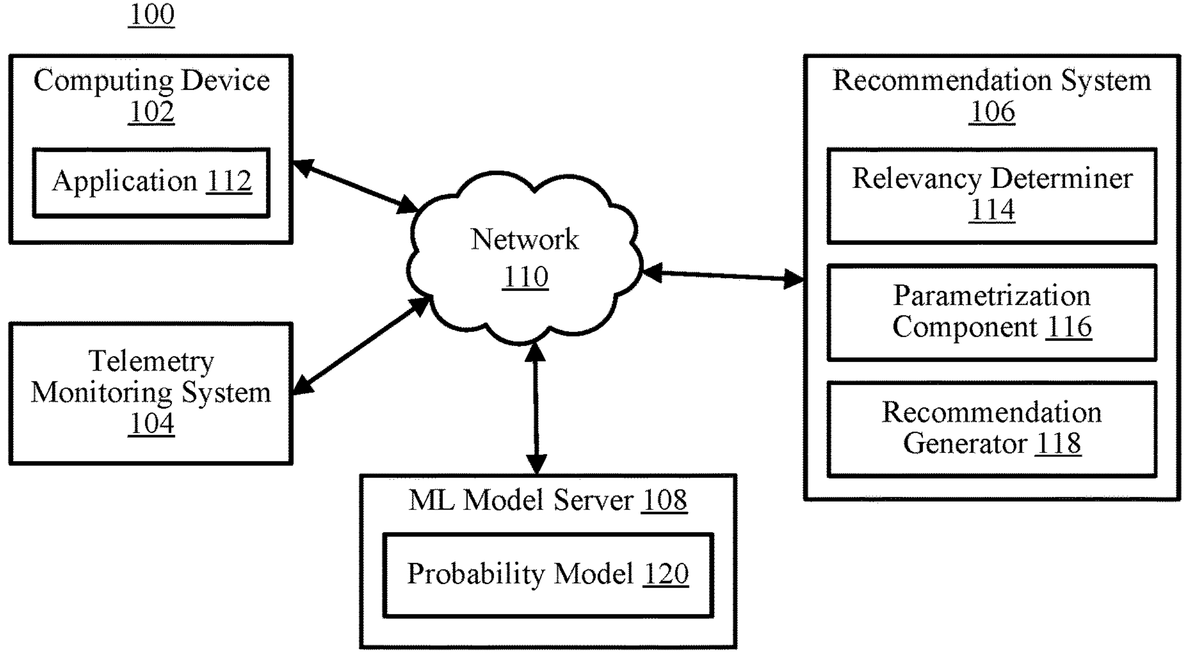
FIG. 1 shows a block diagram of a system for generating a recommendation, in accordance with an example embodiment.
FIG. 2 shows a block diagram of a system for generating a recommendation, in accordance with another example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Recommendation Generation

Recommendation systems are utilized to make recommendations in various ways. For instance, some recommendation systems make a recommendation based on a current data item. Examples of current data items include, but are not limited to, content a user is accessing (e.g., video content, text content, documents, image content, web-based content), a web page or application window a user is interacting with (e.g., via a computing device), a product a user is purchasing (or viewing), a task a user is performing, a document a user is viewing, and/or any other type of item a user or application is (e.g., presently) interacting with and/or otherwise associated with. In this context, a recommendation system utilizes the current data item as a seed for determining other data items to recommend to the user (also referred to as "recommended items" herein). Examples of recommended data items include, but are not limited to, content to access, web pages to view, application features to utilize, products to view or purchase, tasks to perform, documents to view, and/or any other type of item a recommendation system determines to recommend to a user or application based on a seed item.

Implementations of recommendation systems attempt to find the "nearest neighbors" to a seed item in order to provide quality recommendations (e.g., recommendations that are useful to the user or application, related to the seed item, likely to be interacted with the user or application, etc.). For instance, in examples, a recommendation system evaluates pairwise distances between a seed item and potential recommended items in order to determine which other items to recommend. In order to evaluate the distance, features of data items are analyzed with respect to each other. In examples, features include data of different types, e.g., numerical (e.g., floating point numbers, integers, etc.), categorical (e.g., discrete values that belong to a class), ordinal (values in a class with a notion of order), textual (e.g., descriptions in natural language terms), geospatial (e.g., latitude and longitude coordinates, elevation, etc.), date-time (e.g., timestamps, dates, etc.), auditory (e.g., audio recordings, voice recordings, audio portions of video recordings, etc.), video, images (e.g., images or frames of videos), and/or the like. In order to evaluate data of different data types with respect to each other, some implementations of recommendation systems convert data of different types to the same type; however, this can result in loss of information.

Embodiments of the present disclosure provide a parameterized heterogeneous distance function that enables measurement of distances between data items based on features of different data types without requiring converting the features to the same type of data. For example, a measure of relevancy between a first data item and a second data item is received. In an aspect, the measure of relevancy is a function of: a measure of interactions with the second data item based on the first data item as a seed item, and a measure of impressions of the second data item based on the first data item as the seed item. In accordance with an embodiment, the measurements of interactions and impressions are determined based on telemetry associated with a user (or user(s)) behavior (e.g., interactions with data item(s), interactions with application(s), utilization of computing device(s), etc.). A parametrization component determines setting(s) of one or more adjustable parameters of a parameterized heterogeneous distance function based on the measure of relevancy. Examples of adjustable parameters include, but are not limited to, a type of a sub-function for use in calculating a distance between data items based on features of a data type, a value of a weight a sub-function has in determining a relevancy of one data item to another, and/or any other type of adjustable parameter of a heterogeneous distance function, as described elsewhere herein. In embodiments, the parameterized heterogeneous distance function comprises multiple sub-functions, each for use in calculating a distance between data items based on features of a respective data type. In this context, recommendation systems are able to utilize the parameterized heterogeneous distance function to determine distance between data items based on features of multiple data types, without having to convert data to the same data type (which may lose information/context associated with the data/feature).

Embodiments of the present disclosure utilize various sub-functions for different types of data. For instance, example sub-functions utilized for determining the distance between numerical data include, but are not limited to, Euclidean distance functions, Manhattan distance functions, and Chi-square distance functions. Example sub-functions utilized for determining the distance between categorical data include, but are not limited to, Heaviside-like category matching and Jaccard index distance measurement. Example sub-functions utilized for determining the distance between ordinal data include, but are not limited to, ordinal distance and absolute distance. Example sub-functions utilized for determining the distance between textual data include, but are not limited to, text matching, string distance functions (e.g., Hamming distance), and semantic similarity functions. An example sub-function utilized for determining the distance between geospatial data includes, but is not limited to, Haversine distance. An example sub-function utilized for determining the distance between date-time data includes, but is not limited to, calendar-based distance measurement. Example sub-functions utilized for determining the distance between audio data include, but are not limited to, discrete Fourier transform (DFT) algorithms, short time Fourier transform (STFT) algorithms, wavelet algorithms, and fast Fourier transform (FFT) algorithms. An example sub-function utilized for determining the distance between image data includes, but is not limited to, pixel-by-pixel cross-correlation. An example sub-function utilized for determining the distance between video data includes, but is not limited to, pixel-by-pixel cross-correlation between frames. In an example for determining the distance between video data that includes audio and visual components, separate sub-functions are utilized to determine the distance between audio components of the video data and the distance between visual components of the video data.

Furthermore, embodiments of the present disclosure enable customization of a recommendation system for a particular user or user group. For instance, in embodiments, the parametrization component determines settings of adjustable parameters of the parameterized heterogeneous distance function based on telemetry corresponding to a user's behavior. In this manner, the adjustable parameters are set based on a user's preferences. Thus, the resulting parameterized heterogeneous distance function is tailored to the biases of the user. In this context, a recommendation system utilizing the parameterized heterogeneous distance function is able to provide improved (e.g., more accurate) recommendations to a user. Moreover, in an embodiment, a recommendation system utilizes a particular parameterized heterogeneous distance function as a "plug-in" function to determine recommendations for a user. In this context, a recommendation system selectively uses an appropriate parameterized heterogeneous distance function for a corresponding user.

In examples, systems, devices, and apparatuses are configured in various ways for generating recommendations. FIG. 1 shows a block diagram of a system 100 for generating a recommendation, in accordance with an example embodiment. System 100 comprises a computing device 102, a telemetry monitoring system 104, a recommendation system 106, and a machine learning (ML) model server 108. Computing device 102, telemetry monitoring system 104, recommendation system 106, and ML model server 108 are communicatively coupled via network 110. In examples, network 110 comprises one or more networks such as local area networks (LANs), wide area networks (WANs), enterprise networks, the Internet, etc. In examples, network 110 comprises one or more wired and/or wireless portions. The features of system 100 are described in detail as follows.

In examples, computing device 102 is any type of stationary or mobile processing device, including, but not limited to, desktop computers, servers, mobile or handheld devices (e.g., tablets, personal data assistants (PDAs), smart phones, laptops, etc.), Internet-of-Things (IoT) devices, etc. In accordance with an embodiment, computing device 102 is associated with a user (e.g., an individual user (e.g., an individual, an employee, a developer user, a programmer user, an individual owner, etc.), a group of users (e.g., multiple (e.g., related or unrelated) individuals, a team of developers, etc.), an organization (e.g., a customer organization, a product owner organization, etc.), a family user, etc.). As shown in FIG. 1, computing device 102 is configured to execute an application 112. In accordance with an embodiment, application 112 enables a user to perform tasks (e.g., view content, manage content, access a network, access network-accessible storage, access web pages, send and/or receive e-mail, generate documents, take pictures, develop products, develop software, write code, and/or any other type of task performable by a software application).

Telemetry monitoring system 104 is configured to monitor execution and use of applications by users. For instance, telemetry monitoring system 104 in accordance with an embodiment monitors the execution of and use of application 112, actions taken involving application 112, and/or other user behavior with respect to application 112. Examples of user behaviors and actions with respect to an application include, but are not limited to, interacting with an object of a graphic user interface (GUI) of application 112 (e.g., an image, a hyperlink, a textbox, a search bar, a widget, a toggle switch, a search bar, etc.), providing input via a peripheral device of computing device 102 (e.g., a mouse, a keyboard, a joystick, etc.), interacting with a touch interface of computing device 102, inputting a voice command to trigger an action in application 112, and/or any other behavior or action related to the execution of and/or use of application 112. In some examples, telemetry monitoring system 104 measures the amount of time a user utilizes application 112 (e.g., since installing, within a predetermined time (e.g., in the last number of hour(s), day(s), week(s), year(s), etc.), etc.). In accordance with an embodiment, telemetry monitoring system 104 stores telemetry data in a data store (e.g., a storage device of system 100 (not shown in FIG. 1), memory of telemetry monitoring system 104, and/or another data store accessible to telemetry monitoring system 104). In accordance with an embodiment, telemetry monitoring system 104 reports telemetry to another component of system 100 (e.g., computing device 102, recommendation system 106, ML model server 108). Alternatively, or additionally, other components of system 100 request/pull telemetry from telemetry monitoring system 104 (or a data store storing telemetry generated by telemetry monitoring system 104).

ML model server 108 is a network-accessible server (or other type of computing device). In accordance with an embodiment, ML model server 108 is incorporated in a network-accessible server set (e.g., a cloud-based environment, an enterprise network server set, and/or the like). ML model server 108 is configured to execute services and/or store data. For instance, as shown in FIG. 1, ML model server 108 is configured to store and/or execute an ML model 120. In accordance with an embodiment, recommendation system 106 interfaces with ML model 120 over network 110.

Recommendation system 106 is configured to generate a recommendation based on input. In accordance with an embodiment, recommendation system 106 is implemented as a computing device or a set of computing devices. In embodiments, recommendation system 106 generates recommendations based on a request (e.g., a request for a recommendation based on user input) or based on a triggering event (e.g., navigation to a web page in a web browser presented on a computing device (e.g., computing device 102), selection of an object in a GUI of application 112, completion of a task (e.g., a recommendation of a next software development task to perform after another software development task is completed). As shown in FIG. 1, recommendation system 106 comprises a relevancy determiner 114, a parametrization component 116, and a recommendation generator 118, each of which are implemented as subcomponents of and/or subservices executed by recommendation system 106. For instance, in accordance with an embodiment, one or more of relevancy determiner 114, parametrization component 116, and recommendation generator 118 are implemented as program code structured to cause a processor of recommendation system 106 (not shown in FIG. 1 for brevity) to perform corresponding operations described herein.

Relevancy determiner 114 comprises logic for receiving interaction data, receiving impression data, determining measures of relevancy, and/or performing any other operation related to determining relevancy of a data item to another data item. Additional details regarding relevancy determiner 114 are described with respect to FIGS. 8-10, as well as elsewhere herein. Parametrization component 116 comprises logic for receiving a measure of relevancy, determining a setting of a parameter of a heterogeneous distance function, training a probability model, analyzing a ranking of data items, causing recommendation generator 118 to utilize a parameterized heterogeneous distance function, and/or perform any other operation related to determination of parameters of a heterogeneous distance function. Additional details regarding parametrization component 116 are described with respect to FIGS. 2, 3, 6, and 7, as well as elsewhere herein. Recommendation generator 118 comprises logic for generating a recommendation, receiving data items, utilizing parameterized heterogeneous distance functions, selecting a recommendation from a set of potential recommendations, causing a recommendation to be displayed in a GUI, and/or performing any other operation related to generation of a recommendation. Additional details regarding recommendation generator 118 are described with respect to FIGS. 2, 4, and 5, as well as elsewhere herein.

In some implementations, parametrization component 116 utilizes probability model 120 to generate a parameterized heterogeneous distance function. For instance, as described further with respect to FIGS. 6 and 7, in accordance with an embodiment, parametrization component 116 trains probability model 120 to generate a recommendation based on input. In accordance with an embodiment, parametrization component 116 trains probability model 120 utilizing Bayesian optimization. Alternatively, in accordance with another embodiment, parametrization component 116 utilizes simulated annealing, random seeking, pseudo-random seeking, or grid searching to determine settings of adjustable parameters of the parameterized heterogeneous distance function. In accordance with another alternative embodiment, parametrization component 116 utilizes another technique for optimizing a non-differentiable function in order to determine settings of adjustable parameters of the parameterized heterogeneous distance function.

Implementations of recommendation system 106 are configured in various ways to generate recommendations. For example, FIG. 2 shows a block diagram of a system 200 for generating a recommendation, in accordance with another example embodiment. As shown in FIG. 2, system 200 comprises recommendation system 108 (comprising parametrization component 116 and recommendation generator 118), as described with respect to FIG. 1. In accordance with an embodiment, recommendation system 108 of FIG. 2 also comprises relevancy determiner 114 (e.g., as described with respect to FIG. 1), not shown in FIG. 2 for brevity. As also shown in FIG. 2, parametrization component 116 comprises a heterogeneous distance function 202 and a setting determiner 204. In embodiments, setting determiner 204 is a subcomponent and/or subservice of parametrization component 116. Heterogeneous distance function 202, in accordance with an embodiment, is defined by and stored by parametrization component 116 (e.g., in memory of or memory accessible by parametrization component 116). Alternatively, heterogeneous distance function 202 is external to parametrization component 116 (e.g., as part of (e.g., an initial state of) probability model 120 of FIG. 1). As shown in FIG. 2, heterogeneous distance function 202 comprises multiple sub-functions 206A-206*n*. In accordance with an embodiment, each sub-function of heterogeneous distance function 202 calculates a distance between data items based on features of a particular data type. In accordance with a further embodiment, two or more sub-functions of heterogeneous distance function 202 calculate distances between data items based on features of different data types.

Parametrization component 116 of FIG. 2 operates in various ways to determine parameters of a heterogeneous distance function, in embodiments. To better understand the operation of parametrization component 116, FIG. 2 is described with respect to FIG. 3. FIG. 3 shows a flowchart 300 of a process for causing a recommendation system to utilize a parameterized heterogeneous distance function, in accordance with an example embodiment. Parametrization Component 116 of FIG. 2 operates according to flowchart 300, in an embodiment. Note not all steps of FIG. 3 need be performed in all embodiments. Further structural and operational embodiments will be apparent to persons skilled in the relevant art(s) based on the following descriptions of FIGS. 2 and 3.

Flowchart 300 starts with step 302. In step 302, a first measure of relevancy between a first data item and a second data item is received. For example, setting determiner 204 of FIG. 2 receives a measure of relevancy 208, wherein measure of relevancy 208 comprises a relevancy between a first data item and a second data item. In embodiments, measure of relevancy 208 is received from another component of system 100 (e.g., relevancy determiner 114) or from a data store accessible to setting determiner 204 (not shown in FIG. 2 for brevity). In implementations, measure of relevancy 208 comprises numerical data, data structured in a tabular form, a matrix, or another type of data suitable for indicating a measure of relevancy between data items. Further details regarding measures of relevancy and the determination thereof are described with respect to FIGS. 8-10, in Sub-Section B of Section III, and elsewhere herein.

In step 304, a first setting of an adjustable parameter of a parameterized heterogeneous distance function is determined based on the first measure of relevancy, the parameterized heterogeneous distance function comprising a first sub-function and a second sub-function, the first sub-function calculating a distance between data items based on features of a first data type, the second sub-function calculating a distance between data items based on features of a second data type different from the first data type. For example, setting determiner 204 of FIG. 2 determines a first setting of an adjustable parameter of heterogeneous distance function 202 based on measure of relevancy 208. In embodiments, setting determiner 204 determines the setting in order to (e.g., attempt to) maximize relevancy of recommendations made using the parameterized version of heterogeneous distance function 202. Depending on the implementation, setting determiner 204 is configured to adjust the type of sub-function used to calculate a distance between data items and/or a weight of the sub-function in determining the distance between data items.

As described herein, heterogeneous distance function 202 comprises sub-functions 206A-206*n*, each of which are associated with a different data type. In accordance with an embodiment, the distance output by each sub-function is normalized such that distances between data items based on different data types can be combined and evaluated on the same scale. For instance, in a non-limiting example, each sub-function is normalized to output a distance between data items between 0 (e.g., exactly correlated) to 1 (e.g., not correlated). In this example, a smaller number corresponds to a higher similarity; however, in an alternative embodiment, a larger number corresponds to a higher similarity (e.g., 0 indicates no similarity while 1 indicates highest similarity). In some embodiments, and as described further elsewhere herein, weights are applied to each sub-function to adjust the impact a particular sub-function has in determining the overall similarity between data items.

Each of sub-functions 206A-206*n* may be defined in various ways. For instance, suppose there are a number of different types of data in a search-space, e.g., T={t_1, t_2, . . . , t_n}, where t_1 is a first data type, t_2 is a second data type, and t_n is the nth data type. Further suppose a number of different distance functions are able to be applied to a particular data type, such that F(t_i)={f_i_1, f_i_2, . . . , f_i_n} represents a set of distance functions that are applicable to data type t_i (e.g., potential sub-functions of sub-functions 206A-206*n* for data type t_i). Further suppose the first data item, "X", comprises features {x_1, x_2, . . . x_n} and the second data item, "Y", comprises features {y_1, y_2, . . . , y_n}. Further suppose the features of X and Y are grouped according to data type such that:

$$xs(t\_1)=\{x\_i|x\_i \text{ in } t\_1\} \text{ and } ys(t\_1)=\{y\_i|y\_i \text{ in } t\_1\} \text{ for data type } t\_1$$

$$xs(t\_2)=\{x\_i|x\_i \text{ in } t\_2\} \text{ and } ys(t\_2)=\{y\_i|y\_i \text{ in } t\_2\} \text{ for data type } t\_2$$

...

$$xs(t\_n)=\{x\_i|x\_i \text{ in } t\_n\} \text{ and } ys(t\_n)=\{y\_i|y\_i \text{ in } t\_n\} \text{ for data type } t\_n$$

In this example, heterogeneous distance function 202 can be defined as:

$$\mathrm{Dis}(X,Y)=w\_1*F(t\_1\_j)(xs(t\_1), ys(t\_1))+w\_2*F(t\_2\_j)(xs(t\_2), ys(t\_2))+ \ldots +w\_n*F(t\_n\_j)(xs(t\_n), ys(t\_2))$$

where F(t_1_j) is the sub-function utilized for calculating distance between X and Y based on features of data type 1, F(t_2_j) is the sub-function utilized for calculating distance between X and Y based on features of data type 2, and F(t_n_j) is the sub-function utilized for calculating distance between X and Y based on features of data type n. In Dis(X, Y), w_1, w_2, and w_n (collectively referred to as "w_i"), are parameters (e.g., scalar parameters) that encode the relative importance of each data type t_i to the distance function.

In embodiments, F(t_i_j)(xs(t_i), ys(t_i)) represents a sum over all of the features of a data tuple (X, Y) that are part of xs(t_i) and ys(t_i). For example, if t_i represents numerical features and the data items have two numerical features with $$xs(t\_i)=[xs(t\_i)\_1, xs(t\_i)\_2] \text{ and } ys(t\_i)=[ys(t\_i)\_1, ys(t\_i)\_2]$$

then, $$F(t\_i\_j)(xs(t\_i), ys(t\_i))=F(t\_i)(xs(t\_i)\_1, ys(t\_i)\_1)+F(t\_i)(xs(t\_i)\_2, ys(t\_i)\_2)$$

will be the sum of the distance over these two features (e.g., the Euclidean distance in a non-limiting example).

Depending on the implementation, setting determiner 204 determines weights (e.g., values of w_i) and/or types of functions (e.g., which of F(t_i_j) to use for a particular data type). In this context, the weights and types of functions are adjustable parameters of heterogeneous distance function 202 (Dis(X, Y) in the non-limiting example). Setting determiner 204 parameterizes Dis(X, Y) in a manner that improves the relevancy of recommendations made by recommendation systems utilizing Dis(X, Y). In accordance with an embodiment, a Bayesian-optimization process is used to determine the settings of the adjustable parameters. An example process for determining the settings of adjustable parameters is described with respect to FIGS. 6 and 7, as well as elsewhere herein.

Furthermore, while setting determiner 204 is described as determining weights of a particular data type's impact in determining the distance between data items (e.g., w_i) are described herein, embodiments described herein are not so limited. For instance, in an alternative (or additional) embodiment, setting determiner 204 is configured to determine a weight a particular feature has in determining the distance between two data items. As a non-limiting example, consider the above-mentioned sub-function for determining the distance between numerical features wherein the data items have two numerical features. In this alternative embodiment, further suppose weights v_i are applied to the features such that the sub-function is represented as:

$$F(t\_i\_j)(xs(t\_i), ys(t\_i))=v\_1*F(t\_i)(xs(t\_i)\_1, ys(t\_i)\_1)+v\_2*F(t\_i)(xs(t\_i)\_2, ys(t\_i)\_2)$$

where v_1 is representative of the impact xs(t_i)_1 and ys(t_i)_1 have in determining the distance measured by F(t_i_j) and v_2 is representative of the impact xs(t_i)_2 and ys(t_i_2) have in determining the distance measured by F(t_i_j). In this context, setting determiner 204 is able to further tune the parameterized heterogeneous distance function to be used by a recommendation system to generate recommendations, thereby improving the quality of recommendations made.

In step 306, a recommendation generator is caused to utilize the parameterized heterogeneous distance function to generate a recommendation based on received input. For example, setting determiner 204 of FIG. 2 provides parameterized heterogeneous distance function 210 to recommendation generator 118 to cause recommendation generator 118 to utilize parameterized heterogeneous distance function 210 to generate a recommendation 216 based on received input. As shown in FIG. 2, recommendation generator 118 receives a "seed item" 212 and a set of potential recommendation items 214. Additional details regarding operation of recommendation generator 118 are described with respect to FIGS. 4 and 5, as well as elsewhere herein. In accordance with an embodiment, parametrization component 116 generates parameterized heterogeneous distance function 210 off-line (e.g., separate from, parallel to, and/or independent from operation of recommendation generator 118 to generate recommendations). In this context, parametrization component 116 tunes parameterized heterogeneous distance function 210 without negatively impacting a real time user experience.

Recommendation generator 118 of FIG. 2 operates in various ways to generate recommendations. To better understand the operation of recommendation generator 118, FIG. 2 is described with respect to FIG. 4. FIG. 4 shows a flowchart 400 of a process for generating a recommendation, in accordance with an example embodiment. Recommendation generator 118 of FIG. 2 operates according to flowchart 400, in an embodiment. Note not all steps of FIG. 4 need be performed in all embodiments. Further structural and operational embodiments will be apparent to persons skilled in the relevant art(s) based on the following descriptions of FIGS. 2 and 4.

Flowchart 400 begins with step 402. In step 402, a third data item is received. For example, recommendation generator 118 of FIG. 2 receives data item 212. In embodiments, data item 212 corresponds to content or other type of data item a user is interacting with or has recently interacted with (e.g., a recently watched video, a completed movie, a product the user is contemplating buying, a web page the user is navigating in a web browser of computing device 102, and/or the like). In accordance with an embodiment, recommendation generator 118 receives data item 212 from application 112. For instance, in an example, application 112 transmits a request for recommendations to recommendation generator 118, the request for recommendations comprising data item 212 or otherwise indicating data item 212 is the seed item.

In step 404, the parameterized heterogeneous distance function is utilized to determine similarities between the third data item and a set of potential recommendation items. For example, recommendation generator 118 of FIG. 2 utilizes parameterized heterogeneous distance function 210 to determine similarities between data item 212 and one or more potential recommendation item(s) 214 ("potential recommendation items 214" herein). In implementations, potential recommendation items 214 include recommendation items parameterized heterogeneous distance function 210 was trained on and/or additional data items. In accordance with an embodiment, a list of potential recommendation items 214 is included in a request received from application 112. In accordance with an embodiment, recommendation generator 118 utilizes parameterized heterogeneous distance function 210 to generate a respective similarity score between a potential recommendation item and data item 212.

In step 406, a recommendation is generated based on the determined similarities. For example, recommendation generator 118 of FIG. 2 generates recommendation 216 based on similarities determined in step 404. Depending on the implementation, recommendation 216 comprises a single recommended data item (e.g., the recommendation with the highest rank among the set of potential recommended items) or multiple recommended items (e.g., a top n number of possible recommended items (e.g., top 5, top 10, etc.), recommended items with a respective similarity to the seed data item that satisfies a data item similarity criterion, all possible recommended items (e.g., in ranked order), etc.). In accordance with an embodiment, recommendation generator 118 transmits recommendation 216 to application 112. In a further embodiment, the transmission causes application 112 to display recommended items of recommendation 216 in a GUI of application 112.

Recommendation generator 118 of FIG. 2 operates in various ways to generate a recommendation. For instance, FIG. 5 shows a flowchart 500 of a process for selecting a recommendation item, in accordance with an example embodiment. Recommendation generator 118 of FIG. 2 operates according to flowchart 500 in an embodiment. In accordance with an embodiment, flowchart 500 is a further example of step 406 of flowchart 400 of FIG. 4. Note that flowchart 500 need not be performed in all embodiments. Further structural and operational embodiments will be apparent to persons skilled in the relevant art(s) based on the following descriptions of FIG. 5 with respect to FIG. 2.

Flowchart 500 includes step 502. In step 502, a potential recommendation item is selected, the potential recommendation item having a similarity to the third data item higher than other potential recommendation items of the set of potential recommendation items. For example, recommendation generator 118 of FIG. 2 selects a potential recommendation item of potential recommendation items 214 that has a similarity to data item 212 higher than other potential recommendation items. For instance, suppose recommendation generator 118 utilizes parameterized heterogeneous distance function to determine a relevancy score for each of potential recommendation items 214, wherein the respective relevancy score represents how relevant the potential recommendation item is to data item 212. In this context, the relevancy score indicates a level of certainty in which recommendation generator 118 expects a user to interact with the potential recommendation item. In accordance with an embodiment, recommendation generator 118 selects the potential recommendation item with the relevancy score corresponding to the highest relevancy. Depending on the implementation a lower magnitude or higher magnitude of a relevancy score indicates higher relevancy. For instance, in a first non-limiting example, a relevancy score of 0 indicates the potential recommendation item is most-relevant to data item 212 (e.g., has a (e.g., exact) match in similarity) and a relevancy score of 1 indicates the recommendation item is not (e.g., at all) relevant to data item 212. Alternatively, in a second non-limiting example, a relevancy score of 1 indicates the highest degree of relevancy while a relevancy score of 0 indicates the lowest degree of relevancy. In some embodiments, scales other than 0 to 1 are used to measure relevancy/similarity between data items (e.g., 0 to 100, 1 to 100, 1 to 10, etc.).

Figure 6:
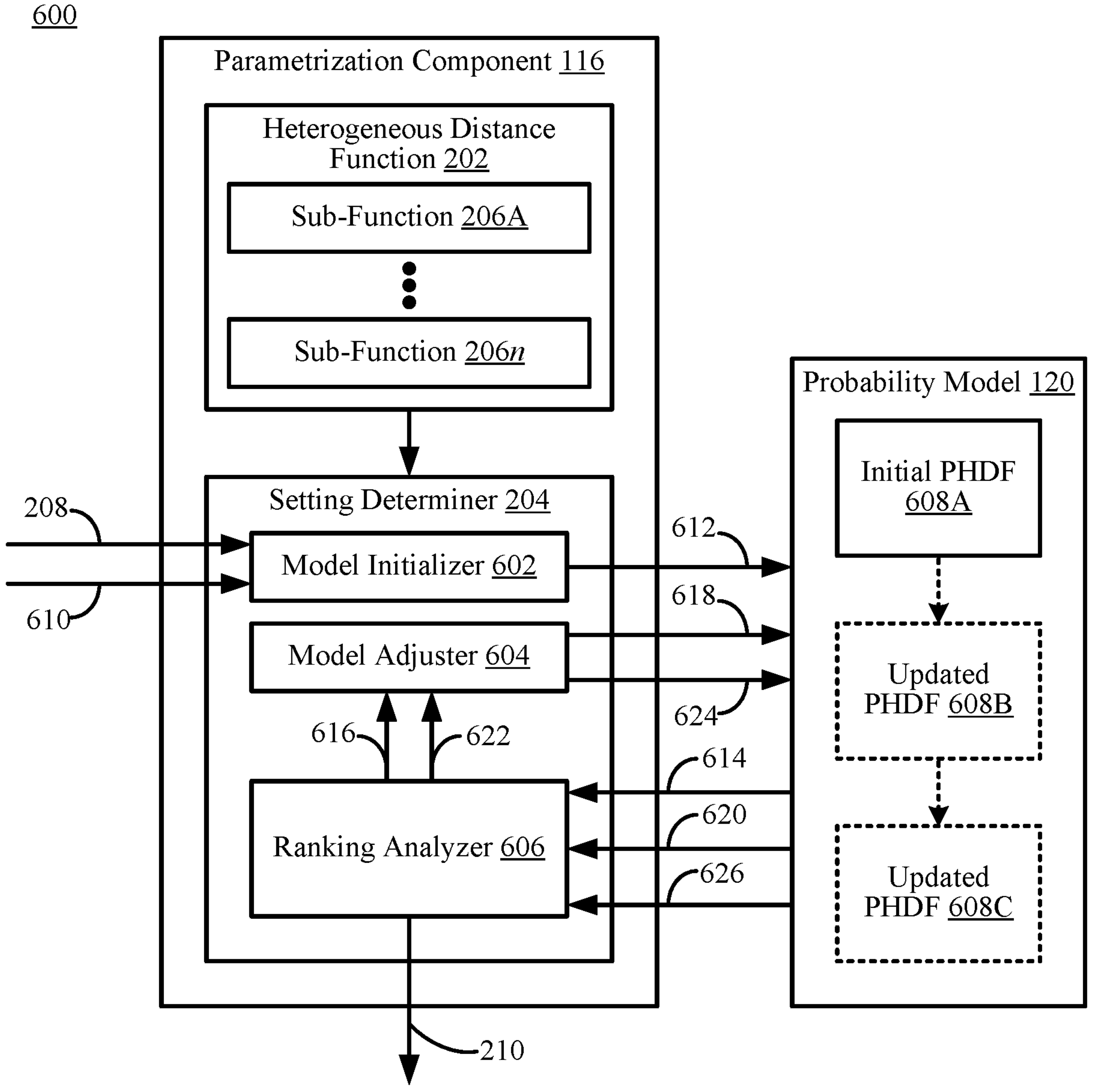
FIG. 6 shows a block diagram of a system for parameterizing a heterogeneous distance function, in accordance with an example embodiment.

In embodiments, parametrization component 116 is configured in various ways to parameterize a heterogeneous distance function. For instance, FIG. 6 shows a block diagram of a system 600 for parameterizing a heterogeneous distance function, in accordance with an example embodiment. As shown in FIG. 6, system 600 comprises parametrization component 116 (comprising heterogeneous distance function 202 (including sub-functions 206A-**206*n*) and setting determiner 204), as described with respect to FIGS. 1 and 2, and probability model 120, as described with respect to FIG. 1. As also shown in FIG. 6, setting determiner 204 comprises a model initializer 602, a model adjuster 604, and a ranking analyzer 606, each of which are implemented as subcomponents and/or sub-services of setting determiner 204. Furthermore, in FIG. 6, probability model 120 comprises an initial parameterized heterogeneous distance function 608A. As discussed elsewhere herein, initial parameterized heterogeneous distance function 608A is updated to updated parameterized heterogeneous distance function 608B and further updated to updated parameterized heterogeneous distance function 608**C.

Figure 7:
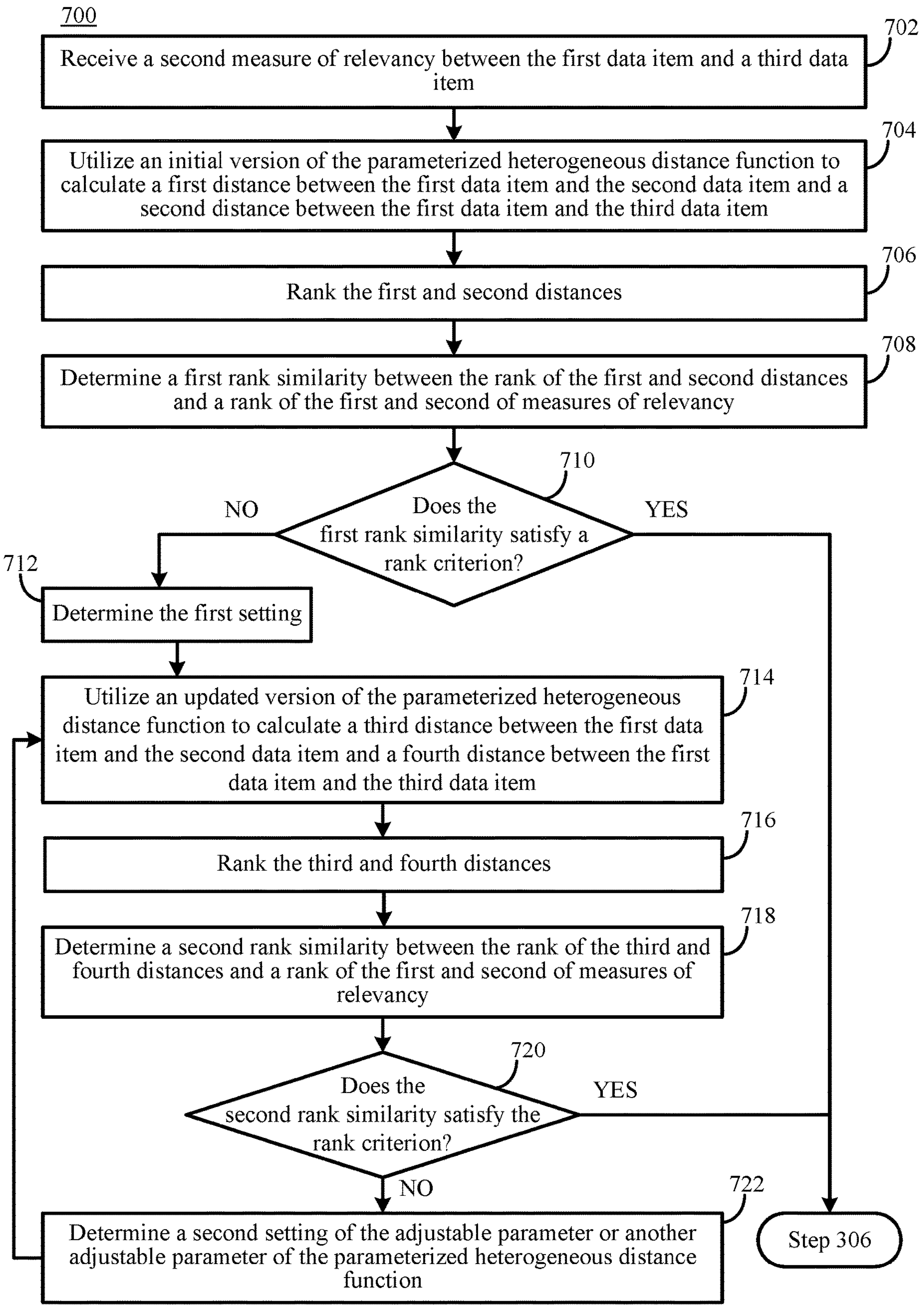
FIG. 7 shows a flowchart of a process for parameterizing a heterogeneous distance function, in accordance with an example embodiment.

To better understand the operation of system 600, FIG. 6 is described with respect to FIG. 7. FIG. 7 shows a flowchart 700 of a process for parameterizing a heterogeneous distance function, in accordance with an example embodiment. Parametrization component 116 of FIG. 6 operates according to flowchart 700 in an embodiment. In accordance with an embodiment, steps of flowchart 700 are further examples of one or more steps of flowchart 300 of FIG. 3. Note not all steps of flowchart 700 need be performed in all embodiments. Further structural and operational embodiments will be apparent to persons skilled in the relevant art(s) based on the following descriptions of FIGS. 6 and 7.

Flowchart 700 begins with step 702, which is a further example of step 302 of flowchart 300 of FIG. 3, in accordance with an embodiment. In step 302, a second measure of relevancy between the first data item and a third data item is received. For example, model initializer 602 receives measures of relevancy 208 and 610, wherein measure of relevancy 208 indicates relevancy between a first data item and a second data item (e.g., as described with respect to FIG. 2) and measure of relevancy 610 indicates relevancy between the first data item and a third data item. Measures of relevancy 208 and 610 are received by model initializer 602 from relevancy determiner 114 of FIG. 1 or from a data store accessibility to model initializer 602. Further details regarding measures of relevancy and the determination thereof are described with respect to FIGS. 8-10, in Sub-Section B of Section III, and elsewhere herein.

Steps 704-722 are further examples of step 304 of flowchart 300 of FIG. 3, in accordance with an embodiment. In step 704, an initial version of the parameterized heterogeneous distance function is utilized to calculate a first distance between the first data item and the second data item and a second distance between the first data item and the third data item. For example, model initializer 602 of FIG. 6 utilizes initial parameterized heterogeneous distance function 608A to calculate a first distance between the first data item and the second data item and a second distance between the first data item and the third data item. As shown in FIG. 6, model initializer 602 transmits a command 612 to cause probability model 120 to calculate distances 614 utilizing initial parameterized heterogeneous distance function 608A. In accordance with an embodiment, command 612 comprises initial settings of adjustable parameters for initial parameterized heterogeneous distance function. In implementations, settings of adjustable parameters of initial parameterized heterogeneous distance function 608A are determined based on default settings of probability model 120 and/or parametrization component 116 or determined randomly (or pseudo-randomly).

In step 706, the first and second distances are ranked. For example, ranking analyzer 606 of FIG. 6 ranks distances 614. In accordance with an embodiment, each distance of distances 614 is represented as a relevancy score indicating a relevancy a data item has to another. For instance, in this example, the first distance is represented as a relevancy score indicating a relevancy the second data item has to the first data item and the second distance is represented as a relevancy score indicating a relevancy the third data item has to the first data item.

In step 708, a first rank similarity between the rank of the first and second distances and a rank of the first and second of measures of relevancy is determined. For example, ranking analyzer 606 of FIG. 6 determines a rank similarity between the rank of distances 614 and a rank of measures 208 and 610. In this context, the capability of probability model 120 utilizing initial parameterized heterogeneous distance function 608A to recommend appropriate data items (e.g., a data item that satisfies a user's expected preference) is evaluated based on relevancy of data items determined from telemetry. Implementations of ranking analyzer 606 utilize various types of ranking quality metrics to evaluate rankings. For instance, in accordance with an embodiment, ranking analyzer 606 utilizes a normalized Discounted Cumulative Gain (nDCG) technique to evaluate rankings 614. In this context, ranking analyzer 606 utilizes the seed item (e.g., the first data item), the recommended items (e.g., the second and third data items) (e.g., including respective rankings 614), and the measures of relevancy 208 and 610 to determine a relevance score averaged over the recommended items. In this context, a lower nDCG score indicates that the recommended items are in better agreement with historical empirical item relevancy. In this context, an ideal ordering of items correlates (e.g., exactly) to the rankings of measures of relevancy.

In step 710, a determination of whether the first rank similarity satisfies a rank criterion is made. For example, ranking analyzer 606 determines whether the rank similarity determined in step 708 satisfies a rank criterion. For instance, in the nDCG implementation, if the nDCG score is lower than a relevancy threshold, the first rank similarity is determined to satisfy the rank criterion. If the first rank similarity is determined to satisfy the rank criterion, ranking analyzer 606 provides parameterized heterogeneous distance function 210 (e.g., initial parameterized heterogeneous distance function 608A) to recommendation generator 118 (not shown in FIG. 6) and flowchart 700 continues to step 306 of flowchart 300. In this context, an optimal (or near optimal) parameterized heterogeneous distance function for use by a recommendation system in recommending data items based on a seed item is determined based on user preferences captured in telemetry. Otherwise, ranking analyzer 606 provides an indication 616 indicating the rank criterion was not satisfied and flowchart 700 continues to step 712.

In step 712, the first setting is determined. For example, model adjuster 604 determines a setting of an adjustable parameter of initial parameterized heterogeneous distance function 608A to adjust. Depending on the implementation, model adjuster 604 determines one or more weights of the parameterized heterogeneous distance function and/or one or more types of sub-function to use for a respective particular data type. In embodiments, model adjuster 604 determines the setting(s) to (e.g., attempt to) maximize the relevance score of recommendations made using the parameterized heterogeneous distance function. In accordance with an embodiment, Bayesian optimization is utilized to determine the first setting.

In step 714, an updated version of the parameterized heterogeneous distance function is utilized to calculate a third distance between the first data item and the second data item and a fourth distance between the first data item and the third data item. For example, model adjuster 604 utilizes updated parameterized heterogeneous distance function 608B to calculate distances 620 (e.g., a third distance between the first data item and the second data item and a fourth distance between the first data item and the third data item). As shown in FIG. 6, model adjuster 604 provides command 618 to probability model 120 to cause probability model 120 to utilize updated parameterized heterogeneous distance function 608B. In accordance with an embodiment, command 618 comprises the setting(s) determined in step 712. In accordance with an embodiment, command 618 causes probability model 120 to update parameter values.

Steps 716-720 are performed in a similar fashion to the performance of steps 706-710. For instance, in step 716, the third and fourth distances are ranked. In step 718, a second rank similarity between the rank of the third and fourth distances and a rank of the first and second measures of relevancy is determined. In step 720, a determination of whether the second rank similarity satisfies the rank criterion is made. For example, ranking analyzer 606 ranks distances 620, determines a rank similarity between the rank of distances 620 and the rank of measures 208 and 610, and determines if the rank similarity satisfies rank criterion. If the second rank similarity satisfies the rank criterion, flowchart 700 continues to step 306 of flowchart 300 of FIG. 3. In this context, an optimal (or near optimal) parameterized heterogeneous distance function (e.g., updated parameterized heterogeneous distance function 608B) for use by a recommendation system in recommending data items based on a seed item is determined based on user preferences captured in telemetry. Otherwise, ranking analyzer 606 provides an indication 622 indicating the rank criterion is not satisfied and flowchart 700 continues to step 722.

In step 722, a second setting of the adjustable parameter or another adjustable parameter of the parameterized heterogeneous distance function is determined. For example, model adjuster 604 determines a second setting of an adjustable parameter of updated parameterized heterogeneous distance function 608B to adjust. Depending on the implementation, model adjuster 604 determines one or more weights of the parameterized heterogeneous distance function and/or one or more types of sub-function to use for a respective particular data type. As discussed with respect to step 712, in embodiments, model adjuster 604 determines the setting(s) to (e.g., attempt to) maximize the relevance score of recommendations made using the parameterized heterogeneous distance function. In accordance with an embodiment, model adjuster 604 determines settings of the same adjustable parameters adjusted in step 712 and/or different/additional adjustable parameters of the parameterized heterogeneous distance function. As shown in FIG. 6, the updated settings result in updated parameterized heterogeneous distance function.

Subsequent to determination of the second setting, flowchart 700 repeats steps in a similar manner as described with respect to steps 714-720. In this context, adjustable parameters of the parameterized heterogeneous distance function are set and/or adjusted until a rank similarity between ranks of distances calculated utilizing the parameterized heterogeneous distance function and ranks of measures of relevancy satisfy the rank criterion. Thus, embodiments of parametrized component 116 train probability model 120 to measure distances between data items in a manner that considers features of multiple data types, wherein at least two data types are different from one another (e.g., without having to convert the data of different types to the same type). By avoiding converting data of different types to the same type in this manner, the context/information associated with the data is preserved, and thus, recommendations made utilizing the parameterized heterogeneous distance function are improved.

An example process for parameterizing a heterogeneous distance function for use in recommending data items has been described with respect to FIGS. 6 and 7. In this context, settings of adjustable parameters the parameterized heterogeneous distance function are determined specific to and based on user preferences captured in telemetry dataset. In other words, embodiments of parametrization component 116 improve the recommendations made by recommendation systems for a particular user (or set of users) based on their behavior/preferences. In implementations, parametrization component 116 is used to generate a parameterized heterogeneous distance function for an individual user, a group of users, an organization, all users of a service, and/or any other type of user or users.

As described herein, parametrization component 116 receives measures of relevancy between data items and utilizes the measures of relevancy to determine settings of adjustable parameters of a parameterized heterogeneous distance function. In this context, the measures of relevancy are considered "training data". Parametrization component 116 receives measures of relevancy in various ways, in embodiments. For instance, in accordance with one or more embodiments, parametrization component 116 receives measures of relevancy from relevancy determiner 114 of FIG. 1. Systems including relevancy determiner 114 are configured in various ways to determine measures of relevancy. For instance, FIG. 8 shows a block diagram of a system 800 for determining a measure of relevancy, in accordance with an example embodiment. As shown in FIG. 8, system 800 comprises telemetry monitoring system 104, relevancy determiner 114, and parametrization component 116, as each described with respect to FIG. 1. In order to better understand the operation of system 800, FIG. 8 is described with respect to FIG. 9. FIG. 9 shows a flowchart 900 of a process for determining a measure of relevancy, in accordance with an example embodiment. In accordance with an embodiment, system 800 operates according to flowchart 900. Note not all steps of flowchart 900 need be performed in all embodiments. Further structural and operational embodiments will be apparent to persons skilled in the relevant art(s) based on the following descriptions of FIGS. 8 and 9.

Flowchart 900 begins with step 902. In step 902, interaction and impression data are received. For example, relevancy determiner 114 of FIG. 8 receives interaction data 802 and impression data 804. Interaction data 802 corresponds to interactions with the second data item based on the first data item as a seed item and impression data 804 corresponds to impressions of the second data item based on the first data item as a seed item. Example interactions include, but are not limited to, selecting a hyperlink corresponding to the second data item, watching a video corresponding to the second data item, viewing an image corresponding to the second data item, opening a document (or other type of file) corresponding to the second data item, purchasing or favoriting a product corresponding to the second data item, and/or any other type of interaction a user may perform or utilize a computing device (or an application executing thereon) with the second data item described elsewhere herein. Example impressions include, but are not limited to, display of an image, video, or text corresponding to the second data item in a GUI, display of a recommendation including the second data item in a GUI, a notification recommending the second data item in a GUI, display of a hyperlink corresponding to the second data item, and/or any other type of impression of the second data item described elsewhere herein.

As a non-limiting example, consider a user "Uk" of computing device 102 has characteristics/side-information {u_1, u_2, . . . , u_k}. Further suppose a seed item s_dj is presented in a graphic user interface (GUI) of application 112 executing on computing device 102 (e.g., a document that the user is browsing, a web page of a product the user is purchasing, etc.). In other words, s_dj is a "context" in which a recommendation system (e.g., recommendation system 106) produces one or more recommended items r_di={r_d1, r_d2, . . . , r_dn}. The user may choose to interact with (or not interact with) any of r_di. In embodiments, telemetry monitoring system 104 collects impression data 804 associated impressions of r_di in the GUI of application 112 and interaction data 802 associated with user Uk's interaction (if any) with one or more of r_di. For instance, an example telemetry record of a telemetry event "m" is shown as:

$$s\_dj(m),\ [r\_d1(m),\ r\_d2(m),\ \ldots,\ r\_dn(m)]$$

In embodiments, telemetry monitoring system 104 collects and records any number of telemetry events for seed items. In implementations, the recommendation items shown in different telemetry events are the same or one or more recommendation items are different between telemetry events. Depending on the implementation, r_di are recommended based on a previous version of the parameterized heterogenous distance function, recommended by a collaborative filtering system (e.g., based on item-similarity, user-similarity, a combination of user-based and item-based similarity, etc.), recommended by a content-based system (e.g., based on user-side information, based on data item-side information, etc.), recommended by a hybrid system (e.g., that utilizes a combination of recommendation techniques).

In step 904, the measure of relevancy between the first and second data items is determined as a function of: a measure of interactions with the second data item based on the first data item as a seed item, and a measure of impressions of the second data item based on the first data item as the seed item. For example, relevancy determiner 114 determines measure of relevancy 208 as a function of interaction data 802 and impression data 804. By determining measure of relevancy 208 as a function of telemetry data, relevancy determiner 114 injects observed user behavior (e.g., user preferences) into the process for parameterizing the heterogeneous distance function. In this context, parametrization component 116 tailors the parameterized heterogeneous distance function to the user (or group of users), improving the quality of recommendations made with respect to that user's activity. As shown in FIG. 9, flow continues to step 302 subsequent to determination of measure of relevancy 208.

In some embodiments, measures of relevancy between data items are determined based on interactions with one data item while the other data item is a seed item. For instance, in accordance with an embodiment, a measure of relevancy of a first data item to a second data item is determined based on interactions with a hyperlink or image corresponding to the second data item while a web browser is depicting a web page corresponding to the first data item. In this context, the measure of relevancy represents a "click-through rate." In order to better understand determination of measures of relevancy between data items, FIG. 10 is described. FIG. 10 depicts an example click-through rate table 1000 ("table 1000"), in accordance with an example embodiment. Table 1000 comprises a set of columns and rows, where each column corresponds to a recommended data item and each row corresponds to a seed data item. In table 1000, the first column is labeled "r_d1" and corresponds to a first data item, "D1", the second column is labeled "r_d2" and corresponds to a second data item, "D2", and the nth column is labeled "r_dn" and corresponds to an nth data item, "Dn". The first row is labeled "s_d1" and corresponds to D1, the second row is labeled "s_d2" and corresponds to D2, and the nth row is labeled "s_dn" and corresponds to Dn. Each cell of table 1000 includes a value of a measure of relevancy between the seed item and the recommended item. In table 1000, the cells corresponding to the seed item and recommended item being the same item are left blank, as they are the same. In table 1000, the value of the measure of relevancy is determined based on click-through rate of a recommended item while a web browser is on a page corresponding to a seed item. In accordance with an embodiment, the click-through rate for an item is determined utilizing the following equation:

$$CTR(r\_di,s\_dj)=(\#\text{ of clicks on }r\_di\text{ when seed is }s\_dj)/(\#\text{ of impressions of }r\_di\text{ when seed is }s\_dj)$$

where r_di is the recommended item and s_dj is the seed item (e.g., corresponding to the page in the web browser). In other words, CTR(r_di, s_dj) is defined as a ratio between the number of clicks (or other interaction) with r_di (conditional that the context is s_dj (i.e., in the web browser example, the current web page displayed by the web browser corresponds to s_dj (e.g., is a product page for s_dj))) and the number of times r_di was recommended (conditional that the context is s_dj).

In accordance with an embodiment, relevancy determiner 114 generates a matrix corresponding to a table such as table 1000 that encodes relevancies of data items. For instance, with respect to table 1000 and flowchart 900, suppose in step 902 that relevancy determiner 114 of FIG. 8 receives interaction data 802 and impression data 804 corresponding to seed items s_d1-s_dn and recommended items r_d1-r_dn. In this context, further suppose relevancy determiner 114, in step 904, generates a matrix of click-through rates of recommended items to seed items that encodes the relevancy of each recommended item to a particular seed item. In this context, the matrix provides information regarding a user's preferences, their behavior, and what they perceive as "nearest neighbors."

Furthermore, while table 1000 of FIG. 10 shows click-through rate measurements for determining a measure of relevancy, embodiments described herein are not so limited. For instance, alternative embodiments utilize purchase rate, favorite rate (e.g., adding an item to a wish list, adding an item to a save-for-later list, bookmarking an item, and/or the like), share rate (e.g., sending a link to a web page to another user and/or account (e.g., via e-mail, via text, via an interface of an application, etc.)), length at which a video was watched (e.g., an amount of time spent watching a recommended video, a percentage of the recommended video watched, whether or not the entire video was watched, etc.), and/or another type of interaction with a recommended item. In some embodiments, multiple types of measurements are used to determine relevancy of one data item to another. For instance, in a non-limiting example, both click-through-rate and purchase rate are utilized to determine the relevancy of one product to another. In some embodiments, different rates are assigned different weights to impact the overall measurement of relevancy. For instance, in a further example where click-through-rate and purchase rate are used, a higher weight is assigned to purchase rate in determining the relevancy of the product to the other.

As shown in FIG. 8, relevancy determiner 114 provides measure of relevancy 208 to parametrization component 116. In accordance with an embodiment, measure of relevancy 208 comprises a matrix that encodes relevancy between data items (e.g., a matrix corresponding to table 1000, in a non-limiting example). In some embodiments, relevancy determiner 114 stores the matrix in a data store (not shown in FIG. 8) accessible to parametrization component 116 for later retrieval.

Figure 11:
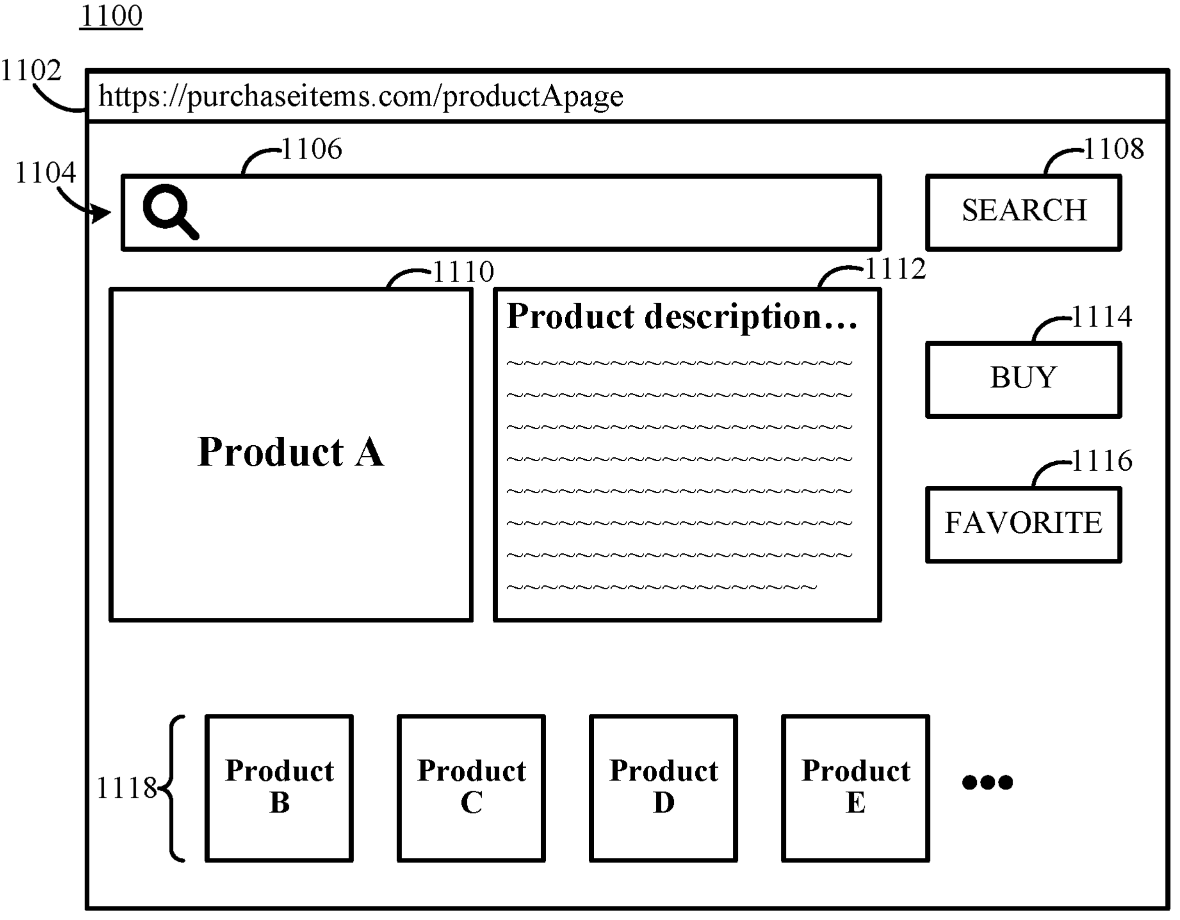
FIG. 11 depicts an example user interface displaying recommendations, in accordance with an example embodiment.

Embodiments of recommendation generator 118 provide recommendations in various ways. For instance, in accordance with an embodiment, recommendation generator 118 causes a recommendation to be displayed in a graphic user interface (GUI) of an application (e.g., application 112) executing on a computing device (e.g., computing device 102). In implementations, GUIs are configured in various ways to display recommendations. For instance, FIG. 11 depicts an example user interface 1100 ("UI 1100") displaying recommendations, in accordance with an example embodiment. As shown in FIG. 11, UI 1100 comprises an address bar 1102 and a window 1104. Address bar 1102 comprises a text field that displays the name or uniform resource locator (URL) of a web page displayed in window 1104. Window 1104 displays the web page. For instance, as shown in FIG. 11, window 1104 displays a web page of a product, "Product A". The displayed web page comprises a search bar 1106, a search button 1108, a product image 1110, a product description 1112, a purchase button 1114, a favorite button 1116, and recommendations 1118. Search bar 1106 is a text field where a search query can be entered (e.g., a search query for a product). Search button 1108 is a button that can be clicked (e.g., using a pointer) or otherwise interacted with to cause the search query in search bar 1106 to be executed (e.g., and cause a page of product search results to be displayed in window 1104). Purchase button 114 is a button that can be clicked or otherwise interacted with to cause Product A to be purchased or added to an online shopping cart. Favorite button 116 is a button that can be clicked or otherwise interacted with to cause Product A to be added to a list of favorite products or a "save for later" list of products.

Product image 1110 and product description 1112 correspond to Product A. In embodiments, product image 1110 is a still image, a video thumbnail, or a collection of multiple images and/or videos. In embodiments, product description 1112 comprises a product name, a brief on the product, a list of features of Product A, and/or any other information regarding Product A. In the example of FIG. 11, Product A is a seed item, as described elsewhere herein. Recommendations 1118 are images, text, links, and/or videos representing recommendations generated by a recommendation system (e.g., recommendation system 108 of FIG. 1) utilizing a parameterized heterogeneous distance function with Product A as a seed item. As shown in FIG. 11, recommendations 1118 include recommendations for a Product B, a Product C, a Product D, and a Product E. In accordance with an embodiment, products of recommendations 1118 are listed in ranked order (e.g., Product B has the highest degree of relevancy to Product A, Product C has the next highest, etc.). In accordance with another embodiment, Products A-E all have a degree of relevancy to Product A surpassing a threshold.

Thus, an illustrative example of presenting recommendations in a GUI has been described with respect to UI 1100 of FIG. 11, wherein the recommendations are determined utilizing a parameterized heterogeneous distance function. For instance, recommendation generator 118 of FIG. 1 in a non-limiting example described herein with respect to FIG. 11 utilizes a parameterized heterogeneous distance function that comprises a first sub-function calculating a distance between products based on image data (e.g., product image 1110, respective images of Products B-E), a second sub-function calculating a distance between products based on textual data (e.g., product description 1112, respective descriptions of Products B-E), a third sub-function calculating a distance between products based on categorical data (e.g., URLs corresponding to Products A-E), and a fourth sub-function calculating a distance between products based on numeric data (e.g., a cost of Products A-E).

III. Additional Embodiments

A. Example Parametrization System Embodiments

Figure 12:
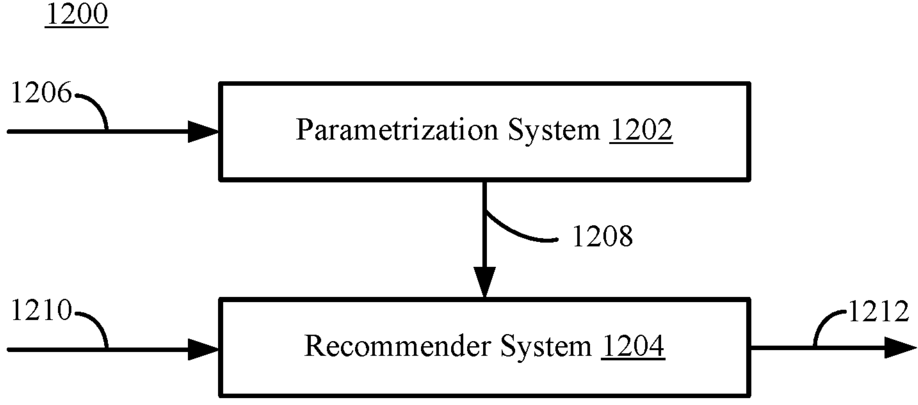
FIG. 12 shows a block diagram of a system for generating a recommendation, in accordance with an example embodiment.

An example embodiment of a recommendation system has been described with respect to recommendation system 108 of FIG. 1. In FIG. 1, recommendation system 108 comprises parametrization component 116 and recommendation generator 118. As described herein, in some embodiments, a system for parameterizing a heterogeneous distance function is separate from the system that utilizes the parameterized heterogeneous distance function for generating recommendations. Such multi-system embodiments are configured in various ways, in embodiments. For example, FIG. 12 shows a block diagram of a system 1200 for generating a recommendation, in accordance with an example embodiment. As shown in FIG. 12, system 1200 comprises a parametrization system 1202 and a recommender system 1204. In embodiments, parametrization system 1202 is configured to generate a parameterized heterogeneous distance function and/or otherwise determine settings of adjustable parameters of the parameterized heterogeneous distance function in a similar manner to techniques described herein with respect to parametrization component 116. Furthermore, recommender system 1204 is configured to utilize the parameterized heterogeneous distance function to generate recommendations in a similar manner to techniques described herein with respect to recommendation generator 118.

For instance, as shown in FIG. 12, parametrization system 1202 receives one or more measures of relevancy 1206 ("measures of relevancy 1206" herein), each measure of relevancy indicating a relevancy a data item has to another data item. Parametrization system 1202 determines settings of adjustable parameters of a parameterized heterogeneous distance function 1208 based on measures of relevancy 1206 and causes recommender system 1204 to utilize parameterized heterogeneous distance function 1208 to generate recommendations. As shown in FIG. 12, recommender system 1204 receives a seed item 1210. Recommender system 1204 utilizes parameterized heterogeneous distance function 1208 to determine similarities between seed item 1210 and a set of potential recommendation items. As also shown in FIG. 12, recommender system 1204 generates a recommendation 1212 based on the determined similarities.

B. Alternative Embodiments of Relevancy Determination

As described with respect to FIGS. 8-10, in some embodiments, a system comprises a relevancy determiner (e.g., relevancy determiner 114) to determine measures of relevancy between data items. However, embodiments described herein are not so limited. For instance, in an alternative embodiment, a measure of relevancy between data items is predetermined and stored in memory accessible to parametrization component 116. In accordance with another embodiment, measures of relevancy between data items are determined based on measures of similarity between embeddings of the data items. For instance, in accordance with an embodiment, an embedding model (e.g., a standalone embedding model, a generative artificial intelligence (AI) model, etc.) is utilized to generate embeddings that provide representation of the data items. In this context, each embedding is an information dense representation of a semantic meaning of an input (e.g., a data item, a portion of a data item, and/or the like). For instance, in accordance with an embodiment, an embedding is a vector of floating-point numbers such that the distance between two embeddings in vector space is correlated with semantic similarity between two inputs in their original format (e.g., text format). As an example, if two data items are similar, their vector representations should also be similar.

C. Utilizing Different Sub-Functions for the Same Data Type

Embodiments of the present disclosure have been described with respect to utilizing different sub-functions in a parameterized heterogeneous distance function for different types of data. However, in some embodiments, different sub-functions are utilized for different pieces of data associated with data items. In this context, different sub-functions may be used for pieces of data of the same type. For instance, in a movie recommendation example, suppose parametrization component 116 of FIG. 1 determines settings of a parameterized heterogeneous distance function utilized for recommending a movie based on another movie (e.g., a favorited movie, a watched movie, a purchased movie, a rented movie, etc.). In this context, features of the movies comprise movie numeric data (e.g., movie run-time, box office gross, etc.), ordinal data (e.g., movie critic ratings, viewer ratings, etc.), categorical data (e.g., movie genre, director names, lead actor(s), etc.), and other data associated with the respective movie. In accordance with an embodiment, parametrization component 116 determines a sub-function for measuring distance between movie genres that yields a better recommendation (e.g., a recommendation rank that satisfies ranking criterion) is different from the sub-function for measuring distance between director names that yields a better recommendation, despite both pieces of data being categorical data. In this example, parametrization component 116 adjusts the parameterized heterogeneous distance function to include both sub-functions applied to their respective pieces of categorical data, e.g., the first sub-function applied to movie genres and the second sub-function applied to director names. By evaluating differences between pieces of data within the same type, such embodiments of parametrization component 116 further improve the quality of recommendations made by recommendation systems utilizing the parameterized heterogeneous distance function.

D. Automated System Utilizing Recommendations

Embodiments of the present disclosure have been described with respect to recommendation systems and recommender systems that generate recommendations utilizing a parameterized heterogeneous distance function. In some implementations, a system or application operates in a manner to leverage such a recommendation system to automatically implement recommendations based on additional user interaction. For instance, with reference to UI 1100 of FIG. 11, suppose UI 1100 is a user interface of application 112. In this example, and as described with respect to FIG. 11, recommendation system 106 causes recommendations 1118 to be displayed in UI 1100. Further suppose a user interacts with one of recommendations 1118 (e.g., the recommendation corresponding to Product B). In this context, interaction with the recommendation causes application 112 to execute an action corresponding to the recommendation of Product B. For instance, in a website storefront embodiment, selecting the recommendation causes the web browser to navigate to a webpage corresponding to Product B. Alternatively, selecting the recommendation causes Product B to be added to a shopping cart or added to a wish list.

While the foregoing non-limiting example has been described with respect to application 112 and recommendation system 106, in another embodiment, the recommendation system is integrated into the same application executing the web page. For instance, in a non-limiting example, application 112 comprises logic that performs operations similar to those described with respect to recommendation system 106 to present recommendations 1118 in UI 1100, detect user interaction with one of the recommendations, and automatically perform an action associated with the recommendation. In accordance with another embodiment, recommendation system 106 comprises logic to detect user interaction or otherwise receive input (e.g., from application 112 or computing device 102) indicative of user interaction with respect to a recommendation and automatically perform an action associated with the recommendation the interaction corresponds to. For instance, recommendation generator 118 in accordance with an embodiment comprises logic to receive input indicative of user interaction and cause an action to be performed with respect to the recommended data item the interaction corresponds to. Alternatively, recommendation system 106 comprises another component (e.g., a recommendation implementer) not shown in FIG. 1 for brevity. Furthermore, while the non-limiting example has been described with respect to the web page and UI implementation of FIG. 11, embodiments described herein are not so limited. For instance, implementations of applications (such as application 112) and/or recommendation systems (such as recommendation system 106 or system 1200) may present recommendations, detect (or otherwise receive) user input/interaction, and perform an action implementing a recommendation or corresponding to a recommendation with respect to recommended content for viewing/accessing, recommended product development tasks for performing, and/or any other scenario in which application 112 or a system utilizing parameterized heterogeneous distance functions to make recommendations may recommend one or more items and, responsive to interaction with or corresponding to a recommended item, perform an action corresponding to the item.

IV. Example Computer System Implementation

Each of computing device 102, telemetry monitoring system 104, recommendation system 106, ML model server 108, system 200, system 600, system 800, parametrization 1202, recommender system 1204, and/or components described therein are implemented in hardware, or hardware combined with one or both of software and/or firmware. For example, application 112, relevancy determiner 114, parametrization component 116, recommendation generator 118, probability model 120, setting determiner 204, model initializer 602, model adjuster 604, ranking analyzer 606, and/or each of the components described therein, and/or the steps of flowcharts 300, 400, 500, 700, and/or 900, and/or any individual steps thereof are each implemented as computer program code/instructions configured to be executed in one or more processors and stored in a computer readable storage medium. Alternatively, application 112, relevancy determiner 114, parametrization component 116, recommendation generator 118, probability model 120, setting determiner 204, model initializer 602, model adjuster 604, ranking analyzer 606, and/or each of the components described therein, and/or the steps of flowcharts 300, 400, 500, 700, and/or 900, and/or any individual steps thereof are each implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 13:
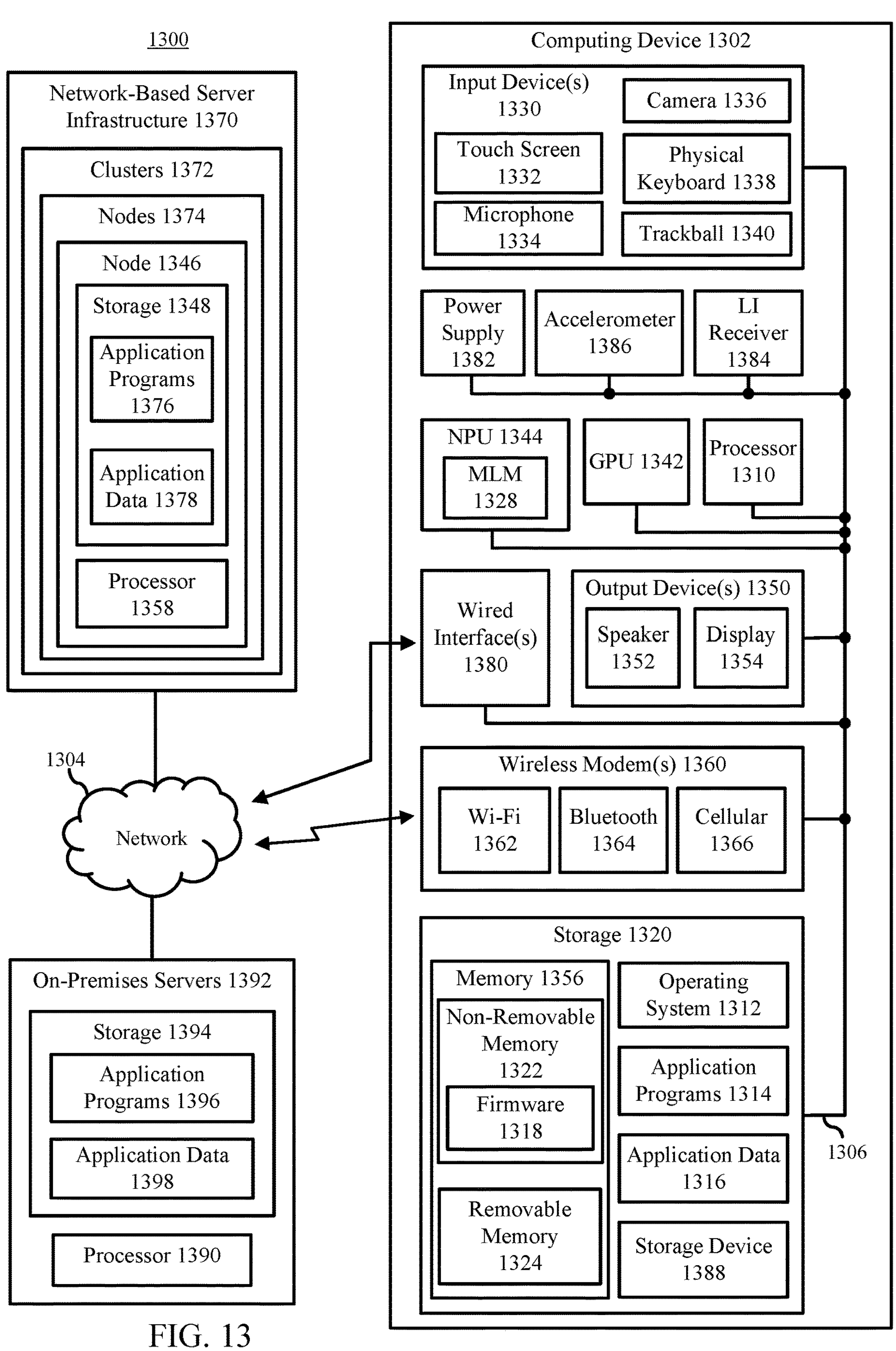
FIG. 13 shows a block diagram of an example computing environment in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 13. FIG. 13 shows a block diagram of an exemplary computing environment 1300 that includes a computing device 1302. Computing device 1302 is an example of computing device 102, telemetry monitoring system 104, recommendation system 106, ML model server 108, parametrization system 1202, and/or recommender system 1204, which each include one or more of the components of computing device 1302. In some embodiments, computing device 1302 is communicatively coupled with devices (not shown in FIG. 13) external to computing environment 1300 via network 1304. In accordance with an embodiment, network 1304 is an example of network 110 of FIG. 1. Network 1304 comprises one or more networks such as local area networks (LANs), wide area networks (WANs), enterprise networks, the Internet, etc. In examples, network 1304 includes one or more wired and/or wireless portions. In some examples, network 1304 additionally or alternatively includes a cellular network for cellular communications. Computing device 1302 is described in detail as follows.

Computing device 1302 can be any of a variety of types of computing devices. Examples of computing device 1302 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1302 is a stationary computing device such as a desktop computer, a personal computer (PC), a stationary server device, a minicomputer, a mainframe, a supercomputer, etc.

As shown in FIG. 13, computing device 1302 includes a variety of hardware and software components, including a processor 1310, a storage 1320, a graphics processing unit (GPU) 1342, a neural processing unit (NPU) 1344, one or more input devices 1330, one or more output devices 1350, one or more wireless modems 1360, one or more wired interfaces 1380, a power supply 1382, a location information (LI) receiver 1384, and an accelerometer 1386. Storage 1320 includes memory 1356, which includes non-removable memory 1322 and removable memory 1324, and a storage device 1388. Storage 1320 also stores an operating system 1312, application programs 1314, and application data 1316. Wireless modem(s) 1360 include a Wi-Fi modem 1362, a Bluetooth modem 1364, and a cellular modem 1366. Output device(s) 1350 includes a speaker 1352 and a display 1354. Input device(s) 1330 includes a touch screen 1332, a microphone 1334, a camera 1336, a physical keyboard 1338, and a trackball 1340. Not all components of computing device 1302 shown in FIG. 13 are present in all embodiments, additional components not shown may be present, and in a particular embodiment any combination of the components are present. In examples, components of computing device 1302 are mounted to a circuit card (e.g., a motherboard) of computing device 1302, integrated in a housing of computing device 1302, or otherwise included in computing device 1302. The components of computing device 1302 are described as follows.

In embodiments, a single processor 1310 (e.g., central processing unit (CPU), microcontroller, a microprocessor, signal processor, ASIC (application specific integrated circuit), and/or other physical hardware processor circuit) or multiple processors 1310 are present in computing device 1302 for performing such tasks as program execution, signal coding, data processing, input/output processing, power control, and/or other functions. In examples, processor 1310 is a single-core or multi-core processor, and each processor core is single-threaded or multithreaded (to provide multiple threads of execution concurrently). Processor 1310 is configured to execute program code stored in a computer readable medium, such as program code of operating system 1312 and application programs 1314 stored in storage 1320. The program code is structured to cause processor 1310 to perform operations, including the processes/methods disclosed herein. Operating system 1312 controls the allocation and usage of the components of computing device 1302 and provides support for one or more application programs 1314 (also referred to as "applications" or "apps"). In examples, application programs 1314 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1310 includes one or more general processors (e.g., CPUs) configured with or coupled to one or more hardware accelerators, such as one or more NPUs 1344 and/or one or more GPUs 1342.

Any component in computing device 1302 can communicate with any other component according to function, although not all connections are shown for ease of illustration. For instance, as shown in FIG. 13, bus 1306 is a multiple signal line communication medium (e.g., conductive traces in silicon, metal traces along a motherboard, wires, etc.) present to communicatively couple processor 1310 to various other components of computing device 1302, although in other embodiments, an alternative bus, further buses, and/or one or more individual signal lines is/are present to communicatively couple components. Bus 1306 represents one or more of any of several types of bus structures, including a memory bus or memory controller, a peripheral bus, an accelerated graphics port, and a processor or local bus using any of a variety of bus architectures.

Storage 1320 is physical storage that includes one or both of memory 1356 and storage device 1388, which store operating system 1312, application programs 1314, and application data 1316 according to any distribution. Non-removable memory 1322 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1322 includes main memory and is separate from or fabricated in a same integrated circuit as processor 1310. As shown in FIG. 13, non-removable memory 1322 stores firmware 1318 that is present to provide low-level control of hardware. Examples of firmware 1318 include BIOS (Basic Input/Output System, such as on personal computers) and boot firmware (e.g., on smart phones). In examples, removable memory 1324 is inserted into a receptacle of or is otherwise coupled to computing device 1302 and can be removed by a user from computing device 1302. Removable memory 1324 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1388 are present that are internal and/or external to a housing of computing device 1302 and are or are not removable. Examples of storage device 1388 include a hard disk drive, a SSD, a thumb drive (e.g., a USB (Universal Serial Bus) flash drive), or other physical storage device.

One or more programs are stored in storage 1320. Such programs include operating system 1312, one or more application programs 1314, and other program modules and program data. Examples of such application programs include computer program logic (e.g., computer program code/instructions) for implementing application 112, relevancy determiner 114, parametrization component 116, recommendation generator 118, probability model 120, setting determiner 204, model initializer 602, model adjuster 604, ranking analyzer 606, and/or each of the components described therein, and/or the steps of flowcharts 300, 400, 500, 700, and/or 900, and/or any individual steps thereof.

Storage 1320 also stores data used and/or generated by operating system 1312 and application programs 1314 as application data 1316. Examples of application data 1316 include web pages, text, images, tables, sound files, video data, and other data. In examples, application data 1316 is sent to and/or received from one or more network servers or other devices via one or more wired or wireless networks. Storage 1320 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1302 through one or more input devices 1330 and receives information from computing device 1302 through one or more output devices 1350. Input device(s) 1330 includes one or more of touch screen 1332, microphone 1334, camera 1336, physical keyboard 1338 and/or trackball 1340 and output device(s) 1350 includes one or more of speaker 1352 and display 1354. Each of input device(s) 1330 and output device(s) 1350 are integral to computing device 1302 (e.g., built into a housing of computing device 1302) or are external to computing device 1302 (e.g., communicatively coupled wired or wirelessly to computing device 1302 via wired interface(s) 1380 and/or wireless modem(s) 1360). Further input devices 1330 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1354 displays information, as well as operating as touch screen 1332 by receiving user commands and/or other information (e.g., by touch, finger gestures, virtual keyboard, etc.) as a user interface. Any number of each type of input device(s) 1330 and output device(s) 1350 are present, including multiple microphones 1334, multiple cameras 1336, multiple speakers 1352, and/or multiple displays 1354.

In embodiments where GPU 1342 is present, GPU 1342 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1342 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1344 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1328. In accordance with an embodiment, MLM 1328 is an example of probability model 120 of FIG. 1. In an example, NPU 1344 is configured for a data-driven parallel computing and is highly efficient at processing massive multimedia data such as videos and images and processing data for neural networks. NPU 1344 is configured for efficient handling of AI-related tasks, such as speech recognition, background blurring in video calls, photo or video editing processes like object detection, etc.

In embodiments disclosed herein that implement ML models, NPU 1344 can be utilized to execute such ML models, of which MLM 1328 is an example. For instance, where applicable, MLM 1328 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1344 is used to train MLM 1328. To train MLM 1328, training data is that includes input features (attributes) and their corresponding output labels/target values (e.g., for supervised learning) is collected. A training algorithm is a computational procedure that is used so that MLM 1328 learns from the training data. Parameters/weights are internal settings of MLM 1328 that are adjusted during training by the training algorithm to reduce a difference between predictions by MLM 1328 and actual outcomes (e.g., output labels). In some examples, MLM 1328 is set with initial values for the parameters/weights. A loss function measures a dissimilarity between predictions by MLM 1328 and the target values, and the parameters/weights of MLM 1328 are adjusted to minimize the loss function. The parameters/weights are iteratively adjusted by an optimization technique, such as gradient descent. In this manner, MLM 1328 is generated through training by NPU 1344 to be used to generate inferences based on received input feature sets for particular applications. MLM 1328 is generated as a computer program or other type of algorithm configured to generate an output (e.g., a classification, a prediction/inference) based on received input features, and is stored in the form of a file or other data structure.

In examples, such training of MLM 1328 by NPU 1344 is supervised or unsupervised. According to supervised learning, input objects (e.g., a vector of predictor variables) and a desired output value (e.g., a human-labeled supervisory signal) train MLM 1328. The training data is processed, building a function that maps new data on expected output values. Example algorithms usable by NPU 1344 to perform supervised training of MLM 1328 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1328 is an LLM, MLM 1328 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1328 is trained to learn patterns from unlabeled data. For instance, in embodiments where MLM 1328 implements unsupervised learning techniques, MLM 1328 identifies one or more classifications or clusters to which an input belongs. During a training phase of MLM 1328 according to unsupervised learning, MLM 1328 tries to mimic the provided training data and uses the error in its mimicked output to correct itself (i.e., correct weights and biases). In further examples, NPU 1344 perform unsupervised training of MLM 1328 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparametrizations.

Note that NPU 1344 need not necessarily be present in all ML model embodiments. In embodiments where ML models are present, any one or more of processor 1310, GPU 1342, and/or NPU 1344 can be present to train and/or execute MLM 1328.

One or more wireless modems 1360 can be coupled to antenna(s) (not shown) of computing device 1302 and can support two-way communications between processor 1310 and devices external to computing device 1302 through network 1304, as would be understood to persons skilled in the relevant art(s). Wireless modem 1360 is shown generically and can include a cellular modem 1366 for communicating with one or more cellular networks, such as a GSM network for data and voice communications within a single cellular network, between cellular networks, or between the mobile device and a public switched telephone network (PSTN). In examples, wireless modem 1360 also or alternatively includes other radio-based modem types, such as a Bluetooth modem 1364 (also referred to as a "Bluetooth device") and/or Wi-Fi modem 1362 (also referred to as an "wireless adaptor"). Wi-Fi modem 1362 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1364 is configured to communicate with another Bluetooth-capable device according to the Bluetooth short-range wireless technology standard(s) such as IEEE 802.15.1 and/or managed by the Bluetooth Special Interest Group (SIG).

Computing device 1302 can further include power supply 1382, LI receiver 1384, accelerometer 1386, and/or one or more wired interfaces 1380. Example wired interfaces 1380 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1380 of computing device 1302 provide for wired connections between computing device 1302 and network 1304, or between computing device 1302 and one or more devices/peripherals when such devices/peripherals are external to computing device 1302 (e.g., a pointing device, display 1354, speaker 1352, camera 1336, physical keyboard 1338, etc.). Power supply 1382 is configured to supply power to each of the components of computing device 1302 and receives power from a battery internal to computing device 1302, and/or from a power cord plugged into a power port of computing device 1302 (e.g., a USB port, an A/C power port). LI receiver 1384 is useable for location determination of computing device 1302 and in examples includes a satellite navigation receiver such as a Global Positioning System (GPS) receiver and/or includes other type of location determiner configured to determine location of computing device 1302 based on received information (e.g., using cell tower triangulation, etc.). Accelerometer 1386, when present, is configured to determine an orientation of computing device 1302.

Note that the illustrated components of computing device 1302 are not required or all-inclusive, and fewer or greater numbers of components can be present as would be recognized by one skilled in the art. In examples, computing device 1302 includes one or more of a gyroscope, barometer, proximity sensor, ambient light sensor, digital compass, etc. In an example, processor 1310 and memory 1356 are co-located in a same semiconductor device package, such as being included together in an integrated circuit chip, FPGA, or system-on-chip (SOC), optionally along with further components of computing device 1302.

In embodiments, computing device 1302 is configured to implement any of the above-described features of flowcharts herein. Computer program logic for performing any of the operations, steps, and/or functions described herein is stored in storage 1320 and executed by processor 1310.

In some embodiments, server infrastructure 1370 is present in computing environment 1300 and is communicatively coupled with computing device 1302 via network 1304. Server infrastructure 1370, when present, is a network-accessible server set (e.g., a cloud-based environment or platform). As shown in FIG. 13, server infrastructure 1370 includes clusters 1372. Each of clusters 1372 comprises a group of one or more compute nodes and/or a group of one or more storage nodes. For example, as shown in FIG. 13, cluster 1372 includes nodes 1374. Each of nodes 1374 are accessible via network 1304 (e.g., in a "cloud-based" embodiment) to build, deploy, and manage applications and services. In examples, any of nodes 1374 is a storage node that comprises a plurality of physical storage disks, SSDs, and/or other physical storage devices that are accessible via network 1304 and are configured to store data associated with the applications and services managed by nodes 1374.

Each of nodes 1374, as a compute node, comprises one or more server computers, server systems, and/or computing devices. For instance, a node 1374 in accordance with an embodiment includes one or more of the components of computing device 1302 disclosed herein. Each of nodes 1374 is configured to execute one or more software applications (or "applications") and/or services and/or manage hardware resources (e.g., processors, memory, etc.), which are utilized by users (e.g., customers) of the network-accessible server set. In examples, as shown in FIG. 13, nodes 1374 includes a node 1346 that includes storage 1348 and/or one or more of a processor 1358 (e.g., similar to processor 1310, GPU 1342, and/or NPU 1344 of computing device 1302). Storage 1348 stores application programs 1376 and application data 1378. Processor(s) 1358 operate application programs 1376 which access and/or generate related application data 1378. In an implementation, nodes such as node 1346 of nodes 1374 operate or comprise one or more virtual machines, with each virtual machine emulating a system architecture (e.g., an operating system), in an isolated manner, upon which applications such as application programs 1376 are executed.

In embodiments, one or more of clusters 1372 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1372 are included in a datacenter in a distributed collection of datacenters. In embodiments, exemplary computing environment 1300 comprises part of a cloud-based platform.

In an embodiment, computing device 1302 accesses application programs 1376 for execution in any manner, such as by a client application and/or a browser at computing device 1302.

In an example, for purposes of network (e.g., cloud) backup and data security, computing device 1302 additionally and/or alternatively synchronizes copies of application programs 1314 and/or application data 1316 to be stored at network-based server infrastructure 1370 as application programs 1376 and/or application data 1378. In examples, operating system 1312 and/or application programs 1314 include a file hosting service client configured to synchronize applications and/or data stored in storage 1320 at network-based server infrastructure 1370.

In some embodiments, on-premises servers 1392 are present in computing environment 1300 and are communicatively coupled with computing device 1302 via network 1304. On-premises servers 1392, when present, are hosted within an organization's infrastructure and, in many cases, physically onsite of a facility of that organization. On-premises servers 1392 are controlled, administered, and maintained by IT (Information Technology) personnel of the organization or an IT partner to the organization. Application data 1398 can be shared by on-premises servers 1392 between computing devices of the organization, including computing device 1302 (when part of an organization) through a local network of the organization, and/or through further networks accessible to the organization (including the Internet). Furthermore, in examples, on-premises servers 1392 serve applications such as application programs 1396 to the computing devices of the organization, including computing device 1302. Accordingly, in examples, on-premises servers 1392 include storage 1394 (which includes one or more physical storage devices such as storage disks and/or SSDs) for storage of application programs 1396 and application data 1398 and include a processor 1390 (e.g., similar to processor 1310, GPU 1342, and/or NPU 1344 of computing device 1302) for execution of application programs 1396. In some embodiments, multiple processors 1390 are present for execution of application programs 1396 and/or for other purposes. In further examples, computing device 1302 is configured to synchronize copies of application programs 1314 and/or application data 1316 for backup storage at on-premises servers 1392 as application programs 1396 and/or application data 1398.

Embodiments described herein may be implemented in one or more of computing device 1302, network-based server infrastructure 1370, and on-premises servers 1392. For example, in some embodiments, computing device 1302 is used to implement systems, clients, or devices, or components/subcomponents thereof, disclosed elsewhere herein. In other embodiments, a combination of computing device 1302, network-based server infrastructure 1370, and/or on-premises servers 1392 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1320. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1314) are stored in storage 1320. Such computer programs can also be received via wired interface(s) 1360 and/or wireless modem(s) 1360 over network 1304. Such computer programs, when executed or loaded by an application, enable computing device 1302 to implement features of embodiments discussed herein. Accordingly, such computer programs represent controllers of the computing device 1302.

Embodiments are also directed to computer program products comprising computer code or instructions stored on any computer-readable medium or computer-readable storage medium. Such computer program products include the physical storage of storage 1320 as well as further physical storage types.

V. Additional Exemplary Embodiments

A system is described herein. The system comprises a processor circuit and a memory device. The memory device stores program code executable by the processor circuit. The program code comprises a parametrization component that: receives a first measure of relevancy between a first data item and a second data item, determines a first setting of an adjustable parameter of a parameterized heterogenous distance function based on the first measure of relevancy, the parameterized heterogeneous distance function comprising a first sub-function and a second-subfunction, the first sub-function calculating a distance between data items based on features of a first data type, the second sub-function calculating a distance between data items based on features of a second data type different from the first data type, and causes a recommendation generator to utilize the parameterized heterogeneous distance function to generate a recommendation based on received input.

In a further example of the foregoing system, the system further comprises a relevancy determiner that determines the first measure of relevancy as a function of: a measure of interactions with the second data item based on the first data item as a seed item, and a measure of impressions of the second data item based on the first data item as the seed item.

In a further example of the foregoing system, the program code comprises the relevancy determiner.

In a further example of the foregoing system, the system further comprises the recommendation generator. The recommendation generator: receives a third data item; utilizes the parameterized heterogeneous distance function to determine similarities between the third data item and a set of potential recommendation items; and generates a recommendation based on the determined similarities.

In a further example of the foregoing system, the recommendation generator causes the recommendation to be presented in a user interface.

In a further example of the foregoing system, the recommendation generator receives an indication of user interaction with the recommendation presented in the user interface and causes an action corresponding to the recommendation to be performed.

In a further example of the foregoing system, to generate the recommendation, the recommendation generator: selects a potential recommendation item with a similarity to the third data item higher than other potential recommendation items of the set of potential recommendation items.

In a further example of the foregoing system, the program code comprises the recommendation generator.

In a further example of the foregoing system, the parametrization component further: receives a second measure of relevancy between the first data item and a third data item; and to determine the first setting, the parametrization component: utilizes an initial version of the parameterized heterogeneous distance function to calculate a first distance between the first data item and the second data item and a second distance between the first data item and the third data item, ranks the first and second distances, determines a first rank similarity between the rank of the first and second distances and a rank of the first and second of measures of relevancy, and subsequent to the determination of the first rank similarity, determines the first setting.

In a further example of the foregoing system, an updated version of the parameterized heterogeneous distance function results from the determination of the first setting. The parametrization component further: utilizes the updated version of the parameterized heterogeneous distance function to calculate a third distance between the first data item and the second data item and a fourth distance between the first data item and the third data item; ranks the third and fourth distances; determines a second rank similarity between the rank of the third and fourth distances and the rank of the first and second of measures of relevancy, and subsequent to the determination of the second rank similarity, determines a second setting of another adjustable parameter of the parameterized heterogeneous distance function.

In a further example of the foregoing system, an updated version of the parameterized heterogeneous distance function results from the determination of the first setting. The parametrization component further: utilizes the updated version of the parameterized heterogeneous distance function to calculate a third distance between the first data item and the second data item and a fourth distance between the first data item and the third data item; ranks the third and fourth distances; determines a second rank similarity between the rank of the third and fourth distances and the rank of the first and second of measures of relevancy, and subsequent to the determination of the second rank similarity, determines a second setting of the adjustable parameter of the parameterized heterogeneous distance function.

In a further example of the foregoing system, to determine the first setting, the parametrization component: performs Bayesian optimization with respect to the parameterized heterogeneous distance function based on the first rank similarity.

In a further example of the foregoing system, to determine the first rank similarity, the parametrization component: evaluates a normalized cumulative discount gain determined based on the rank of the first and second distance, the rank of the first and second measures of relevancy, and the first data item.

In a further example of the foregoing system, the adjustable parameter is a function type of the first sub-function.

In a further example of the foregoing system, the adjustable parameter is a weight the first sub-function has in determining the distance between data items.

In a further example of the foregoing system, the adjustable parameter is a weight of a portion of the first sub-function corresponding to a sub-set of data of the first data type has in determining the distance between data items.

In a further example of the foregoing system, the adjustable parameter is a function type of the second sub-function.

In a further example of the foregoing system, the adjustable parameter is a weight the second sub-function has in determining the distance between data items.

In a further example of the foregoing system, the adjustable parameter is a weight of a portion of the second sub-function corresponding to a sub-set of data of the second data type has in determining the distance between data items.

A parametrization system for recommendation functions is described herein. The parametrization system comprises a processor circuit and a memory device. The memory device stores program code structured to cause the processor circuit to: receive a measure of relevancy between a first data item and a second data item; determine a first setting of an adjustable parameter of a parameterized heterogenous distance function based on the measure of relevancy, the parameterized heterogeneous distance function comprising a first sub-function and a second sub-function, the first sub-function calculating a distance between data items based on features of a first data type, the second sub-function calculating a distance between data items based on features of a second data type different from the first data type; and cause a recommender system to utilize the parameterized heterogeneous distance function to generate a recommendation based on received input.

In a further example of the foregoing parametrization system, the parametrization system causes the recommender system to cause the recommendation to be presented in a user interface.

In a further example of the foregoing parametrization system, the recommender system receives an indication of user interaction with the recommendation presented in the user interface and causes an action corresponding to the recommendation to be performed.

In a further example of the foregoing parametrization system, the first measure of relevancy is the result of a function of: a measure of interactions with the second data item based on the first data item as a seed item, and a measure of impressions of the second data item based on the first data item as the seed item.

In a further example of the foregoing parametrization system, the program code is further structured to cause the processor circuit to cause the recommender system to: utilize the parameterized heterogeneous distance function to determine similarities between a third data item and a set of potential recommendation items and generate a recommendation based on the determined similarities.

In a further example of the foregoing parametrization system, the program code is further structured to cause the processor circuit to cause the recommender system to select a potential recommendation item with a similarity to the third data item higher than other potential recommendation items of the set of potential recommendation items.

In a further example of the foregoing parametrization system, the program code is further structured to cause the processor circuit to: receive a second measure of relevancy between the first data item and a third data item; and wherein to determine the first setting, the program code is structured to cause the processor circuit to: utilize an initial version of the parameterized heterogeneous distance function to calculate a first distance between the first data item and the second data item and a second distance between the first data item and the third data item, rank the first and second distances, determine a first rank similarity between the rank of the first and second distances and a rank of the first and second of measures of relevancy, and subsequent to determination of the first rank similarity, determine the first setting.

In a further example of the foregoing parametrization system, an updated version of the parameterized heterogeneous distance function results from determination of the first setting, and the program code is further structured to cause the processor circuit to: utilize the updated version of the parameterized heterogeneous distance function to calculate a third distance between the first data item and the second data item and a fourth distance between the first data item and the third data item; rank the third and fourth distances; determine a second rank similarity between the rank of the third and fourth distances and the rank of the first and second of measures of relevancy, and subsequent to the determination of the second rank similarity, determine a second setting of another adjustable parameter of the parameterized heterogeneous distance function.

In a further example of the foregoing parametrization system, an updated version of the parameterized heterogeneous distance function results from determination of the first setting, and the program code is further structured to cause the processor circuit to: utilize the updated version of the parameterized heterogeneous distance function to calculate a third distance between the first data item and the second data item and a fourth distance between the first data item and the third data item; rank the third and fourth distances; determine a second rank similarity between the rank of the third and fourth distances and the rank of the first and second of measures of relevancy, and subsequent to the determination of the second rank similarity, determine a second setting of the adjustable parameter of the parameterized heterogeneous distance function.

In a further example of the foregoing parametrization system, to determine the first setting, the program code is structured to cause the processor circuit to perform Bayesian optimization with respect to the parameterized heterogeneous distance function based on the first rank similarity.

In a further example of the foregoing parametrization system, to determine the first setting, the program code is structured to cause the processor circuit to: evaluate a normalized cumulative discount gain determined based on the rank of the first and second distance, the rank of the first and second measures of relevancy, and the first data item.

In a further example of the foregoing parametrization system, the adjustable parameter is a function type of the first sub-function.

In a further example of the foregoing parametrization system, the adjustable parameter is a weight the first sub-function has in determining the distance between data items.

In a further example of the foregoing parametrization system, the adjustable parameter is a weight of a portion of the first sub-function corresponding to a sub-set of data of the first data type has in determining the distance between data items.

In a further example of the foregoing parametrization system, the adjustable parameter is a function type of the second sub-function.

In a further example of the foregoing parametrization system, the adjustable parameter is a weight the second sub-function has in determining the distance between data items.

In a further example of the foregoing parametrization system, the adjustable parameter is a weight of a portion of the second sub-function corresponding to a sub-set of data of the second data type has in determining the distance between data items.

A method is described herein. The method comprises: receiving a measure of relevancy between a first data item and a second data item; determining a first setting of an adjustable parameter of a parameterized heterogenous distance function based on the measure of relevancy, the parameterized heterogeneous distance function comprising a first sub-function and a second-subfunction, the first sub-function calculating a distance between data items based on features of a first data type, the second sub-function calculating a distance between data items based on features of a second data type different from the first data type; and causing a recommender system to utilize the parameterized heterogeneous distance function to generate a recommendation based on received input.

In a further example of the foregoing method, the method further comprises causing the recommender system to cause the recommendation to be presented in a user interface.

In a further example of the foregoing method, the method further comprises causing to recommender system to: receive an indication of user interaction with the recommendation presented in the user interface and cause an action corresponding to the recommendation to be performed.

In a further example of the foregoing method, the first measure of relevancy is the result of a function of: a measure of interactions with the second data item based on the first data item as a seed item, and a measure of impressions of the second data item based on the first data item as the seed item.

In a further example of the foregoing method, the method further comprises: causing the recommender system to: utilize the parameterized heterogeneous distance function to determine similarities between a third data item and a set of potential recommendation items and generate a recommendation based on the determined similarities.

In a further example of the foregoing method, the method further comprises: causing the recommender system to select a potential recommendation item with a similarity to the third data item higher than other potential recommendation items of the set of potential recommendation items.

In a further example of the foregoing method, the method further comprises receiving a second measure of relevancy between the first data item and a third data item; and wherein said determining the first setting comprises: utilizing an initial version of the parameterized heterogeneous distance function to calculate a first distance between the first data item and the second data item and a second distance between the first data item and the third data item, ranking the first and second distances, determining a first rank similarity between the rank of the first and second distances and a rank of the first and second of measures of relevancy, and subsequent to said determining of the first rank similarity, determining the first setting.

In a further example of the foregoing method, an updated version of the parameterized heterogeneous distance function results from said determining the first setting, and the method further comprises: utilizing the updated version of the parameterized heterogeneous distance function to calculate a third distance between the first data item and the second data item and a fourth distance between the first data item and the third data item; ranking the third and fourth distances; determining a second rank similarity between the rank of the third and fourth distances and the rank of the first and second of measures of relevancy, and subsequent to said determining the second rank similarity, determining a second setting of the adjustable parameter of the parameterized heterogeneous distance function.

In a further example of the foregoing method, an updated version of the parameterized heterogeneous distance function results from said determining the first setting, and the method further comprises: utilizing the updated version of the parameterized heterogeneous distance function to calculate a third distance between the first data item and the second data item and a fourth distance between the first data item and the third data item; ranking the third and fourth distances; determining a second rank similarity between the rank of the third and fourth distances and the rank of the first and second of measures of relevancy, and subsequent to said determining the second rank similarity, determining a second setting of another adjustable parameter of the parameterized heterogeneous distance function.

In a further example of the foregoing method, said determining the first setting comprises performing Bayesian optimization with respect to the parameterized heterogeneous distance function based on the first rank similarity.

In a further example of the foregoing method, the method further comprises: evaluating a normalized cumulative discount gain determined based on the rank of the first and second distance, the rank of the first and second measures of relevancy, and the first data item.

In a further example of the foregoing method, the method further comprises: receiving interaction and impression data, the interaction data corresponding to interactions with the second data item based on the first data item as a seed item and the impression data corresponding to impressions of the second data item based on the first data item as a seed item; and determining the measure of relevancy as a function of: a measure of the interactions with the second data item based on the first data item as a seed item, and a measure of the impressions of the second data item based on the first data item as the seed item.

In a further example of the foregoing method, the adjustable parameter is a function type of the first sub-function.

In a further example of the foregoing method, the adjustable parameter is a weight the first sub-function has in determining the distance between data items.

In a further example of the foregoing method, the adjustable parameter is a weight of a portion of the first sub-function corresponding to a sub-set of data of the first data type has in determining the distance between data items.

In a further example of the foregoing method, the adjustable parameter is a function type of the second sub-function.

In a further example of the foregoing method, the adjustable parameter is a weight the second sub-function has in determining the distance between data items.

In a further example of the foregoing method, the adjustable parameter is a weight of a portion of the second sub-function corresponding to a sub-set of data of the second data type has in determining the distance between data items.

A computer-readable storage medium is described herein. The computer-readable storage medium encoded with program instructions structured to cause a processor to perform any of the foregoing methods.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, applications, recommendation systems, parametrization systems, recommender systems, probability models, relevancy determiners, telemetry monitoring systems, parametrization components, recommendation generators, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
- a processor circuit; and
- a memory device that stores program code executable by the processor circuit, the program code comprising:
  - a relevancy determiner that:
    - determines a first measure of relevancy as a function of:
      - a measure of interactions with a second data item based on a first data item as a seed item, and
      - a measure of impressions of the second data item based on the first data item as the seed item;
  - a parametrization component that:
    - determines a first setting of an adjustable parameter of a parameterized heterogenous distance function based on the first measure of relevancy, the parameterized heterogeneous distance function comprising a first sub-function and a second-subfunction, the first sub-function calculating a distance between data items based on features of a first data type, the second sub-function calculating a distance between data items based on features of a second data type different from the first data type; and
  - a recommendation generator that:
    - generates, using the parameterized heterogeneous distance function, a recommended development task based on received input, and
    - automatically performs a first action of the recommended development task.

2. The system of claim 1, wherein the recommendation generator:
- receives a third data item;
- determines, using the parameterized heterogeneous distance function, similarities between the third data item and a set of potential recommendation items;
- generates the recommended development task based on the determined similarities; and
- causes a recommendation of the recommended development task to be presented in a user interface.

3. The system of claim 2, the recommendation generator further:
- receives an indication of user interaction with the recommendation presented in the user interface; and
- causes a second action corresponding to the recommendation to be performed.

4. The system of claim 2, wherein to generate the recommendation, the recommendation generator:
- selects a potential recommendation item with a similarity to the third data item higher than other potential recommendation items of the set of potential recommendation items.

5. The system of claim 1, wherein the parametrization component further:
- receives a second measure of relevancy between the first data item and a third data item; and
- to determine the first setting, the parametrization component:
  - calculates, using an initial version of the parameterized heterogeneous distance function, a first distance between the first data item and the second data item and a second distance between the first data item and the third data item,
  - ranks the first and second distances,
  - determines a first rank similarity between the rank of the first and second distances and a rank of the first and second of measures of relevancy, and
  - subsequent to the determination of the first rank similarity, determines the first setting.

6. The system of claim 5, wherein an updated version of the parameterized heterogeneous distance function results from the determination of the first setting, and the parametrization component further:
- calculates, utilizing the updated version of the parameterized heterogeneous distance function, a third distance between the first data item and the second data item and a fourth distance between the first data item and the third data item;
- ranks the third and fourth distances;
- determines a second rank similarity between the rank of the third and fourth distances and the rank of the first and second of measures of relevancy, and
- subsequent to the determination of the second rank similarity, determines a second setting of another adjustable parameter of the parameterized heterogeneous distance function.

7. The system of claim 5, wherein to determine the first setting, the parametrization component:

performs Bayesian optimization with respect to the parameterized heterogeneous distance function based on the first rank similarity.

8. The system of claim 5, wherein to determine the first rank similarity, the parametrization component:

evaluates a normalized cumulative discount gain determined based on the rank of the first and second distance, the rank of the first and second measures of relevancy, and the first data item.

9. The system of claim 1, wherein the adjustable parameter comprises:

a function type of the first sub-function; or a weight the first sub-function has in determining the distance between data items.

10. A method, comprising:

receiving a first measure of relevancy between a first data item and a second data item;

determining a first setting of an adjustable parameter of a parameterized heterogenous distance function based on the first measure of relevancy, the parameterized heterogeneous distance function comprising a first sub-function and a second-subfunction, the first sub-function calculating a distance between data items based on features of a first data type, the second sub-function calculating a distance between data items based on features of a second data type different from the first data type;

generating, using the parameterized heterogeneous distance function, a recommended development task based on received input; and automatically performing an action of the recommended development task.

11. The method of claim 10, wherein said generating the recommended development task further comprises:

causing a recommendation of the recommended development task to be presented in a user interface of a computing device.

12. The method of claim 10, further comprising:

receiving a second measure of relevancy between the first data item and a third data item; and wherein said determining the first setting comprises:

calculating, utilizing an initial version of the parameterized heterogeneous distance function, a first distance between the first data item and the second data item and a second distance between the first data item and the third data item, ranking the first and second distances, determining a first rank similarity between the rank of the first and second distances and a rank of the first and second of measures of relevancy, and subsequent to said determining of the first rank similarity, determining the first setting.

13. The method of claim 12, wherein an updated version of the parameterized heterogeneous distance function results from said determining the first setting, and the method further comprises:

calculating, utilizing the updated version of the parameterized heterogeneous distance function, a third distance between the first data item and the second data item and a fourth distance between the first data item and the third data item;

ranking the third and fourth distances;

determining a second rank similarity between the rank of the third and fourth distances and the rank of the first and second of measures of relevancy, and subsequent to said determining the second rank similarity, determining a second setting of the adjustable parameter of the parameterized heterogeneous distance function.

14. The method of claim 12, wherein said determining the first setting comprises:

performing Bayesian optimization with respect to the parameterized heterogeneous distance function based on the first rank similarity.

15. The method of claim 10, further comprising:

receiving interaction and impression data, the interaction data corresponding to interactions with the second data item based on the first data item as a seed item and the impression data corresponding to impressions of the second data item based on the first data item as a seed item; and determining the first measure of relevancy as a function of:

a measure of the interactions with the second data item based on the first data item as a seed item, and a measure of the impressions of the second data item based on the first data item as the seed item.

16. A parametrization system for recommendation functions comprising:

a processor circuit; and a memory device that stores program code structured to cause the processor circuit to:

receive a first measure of relevancy between a first data item and a second data item;

determine a first setting of an adjustable parameter of a parameterized heterogenous distance function based on the first measure of relevancy, the parameterized heterogeneous distance function comprising a first sub-function and a second sub-function, the first sub-function calculating a distance between data items based on features of a first data type, the second sub-function calculating a distance between data items based on features of a second data type different from the first data type; and cause a recommendation system to:

generate, utilizing the parameterized heterogeneous distance function, a recommended development task based on received input, and automatically perform an action of the recommended development task.

17. The parametrization system of claim 16, wherein to cause the recommendation system to generate the recommended development task, the program code is further structured to cause the processor circuit to:

cause the recommendation system to cause a recommendation of the recommended development task to be presented in a user interface of a computing device.

18. The parametrization system of claim 16, wherein the program code is further structured to cause the processor circuit to:

receive a second measure of relevancy between the first data item and a third data item; and wherein to determine the first setting, the program code is structured to cause the processor circuit to:

calculate, utilizing an initial version of the parameterized heterogeneous distance function to calculate a first distance between the first data item and the second data item and a second distance between the first data item and the third data item, rank the first and second distances, determine a first rank similarity between the rank of the first and second distances and a rank of the first and second of measures of relevancy, and subsequent to determination of the first rank similarity, determine the first setting.

19. The parametrization system of claim 18, wherein an updated version of the parameterized heterogeneous distance function results from determination of the first setting, and the program code is further structured to cause the processor circuit to:

calculate, utilizing the updated version of the parameterized heterogeneous distance function, a third distance between the first data item and the second data item and a fourth distance between the first data item and the third data item;

rank the third and fourth distances;

determine a second rank similarity between the rank of the third and fourth distances and the rank of the first and second of measures of relevancy, and subsequent to the determination of the second rank similarity, determine a second setting of another adjustable parameter of the parameterized heterogeneous distance function.

20. The parametrization system of claim 18, wherein to determine the first setting, the program code is structured to cause the processor circuit to:

perform Bayesian optimization with respect to the parameterized heterogeneous distance function based on the first rank similarity.

* * * * *